(12) United States Patent  
Van Druten

(10) Patent No.: US 12,163,561 B2  
(45) Date of Patent: Dec. 10, 2024

(54) CLUTCH OR BRAKE SYSTEM FOR A TORQUE TRANSMISSION WITH A PLANETARY GEAR

(71) Applicant: Classified Cycling B.V., Antwerp (BE)

(72) Inventor: Roëll Marie Van Druten, Eindhoven (NL)

(73) Assignee: CLASSIFIED CYCLING B.V., Antwerp (BE)

( * ) Notice: Subject to any disclaimer, the term of this patent is extended or adjusted under 35 U.S.C. 154(b) by 0 days.

(21) Appl. No.: 18/009,163

(22) PCT Filed: Jun. 7, 2021

(86) PCT No.: PCT/EP2021/065174  
§ 371 (c)(1),  
(2) Date: Dec. 8, 2022

(87) PCT Pub. No.: WO2021/249945  
PCT Pub. Date: Dec. 16, 2021

(65) Prior Publication Data  
US 2023/0220887 A1    Jul. 13, 2023

(30) Foreign Application Priority Data

Jun. 8, 2020 (NL) ..................... 2025786  
Jul. 15, 2020 (NL) ..................... 2026067  
Sep. 22, 2020 (NL) ..................... 2026514

(51) Int. Cl.  
*F16D 41/30* (2006.01)  
*B62M 11/14* (2006.01)  
*F16H 3/46* (2006.01)

(52) U.S. Cl.  
CPC ............ *F16D 41/30* (2013.01); *B62M 11/14* (2013.01); *F16H 3/46* (2013.01);  
(Continued)

(58) Field of Classification Search  
CPC ............... F16H 3/46; F16H 2200/2005; F16H 2200/2033; F16H 2200/2035;  
(Continued)

(56) References Cited

U.S. PATENT DOCUMENTS 11,346,405 B2 * 5/2022 Van Druten .............. F16H 9/26  
2016/0305496 A1 * 10/2016 Liu ......................... B62M 11/16  
(Continued)

FOREIGN PATENT DOCUMENTS

WO  2018/199757 A2  11/2018  
WO  2020/085911 A2  4/2020  
WO  2021/080431 A1  4/2021

OTHER PUBLICATIONS

International Search Report dated Oct. 6, 2021, issued in corresponding International Application No. PCT/EP2021/065174 (4 pgs.).

(Continued)

*Primary Examiner* — Roger L Pang  
(74) *Attorney, Agent, or Firm* — Pillsbury Winthrop Shaw Pittman, LLP

(57) ABSTRACT

A clutch or brake system for a torque transmission. The clutch or brake system includes a first rotatable unit connectable to an input or output, including at least one first abutment surface and a second rotatable unit connectable to an output or input, respectively, including at least one second abutment surface arranged for selectively engaging the first abutment surface. The first and second abutment surfaces are adapted to each other so as to allow disengaging under load. The system includes a third rotatable unit including at least one retaining member, the third unit being arranged for selectively being in a first rotational position or a second rotational position relative to the second rotatable unit, wherein the at least one retaining member in the first (Continued)

rotational position locks the at least one second abutment surface for rotationally coupling the second rotatable unit to the first rotatable unit.

18 Claims, 18 Drawing Sheets

(52) U.S. Cl.
CPC ............... *F16H 2200/2005* (2013.01); *F16H 2200/2033* (2013.01); *F16H 2200/2066* (2013.01)

(58) Field of Classification Search
CPC .. F16H 2200/2066; F16D 41/30; F16D 41/32; F16D 41/12; F16D 41/125; F16D 41/14; F16D 41/16; B62M 11/14
USPC .................................................. 475/269, 294
See application file for complete search history.

(56) References Cited

U.S. PATENT DOCUMENTS

2021/0354783 A1\* 11/2021 Van Druten ............ F16D 28/00
2022/0402574 A1\* 12/2022 Van Druten .............. F16H 3/10

OTHER PUBLICATIONS

Written Opinion of the International Searching Authority dated Oct. 6, 2021, issued in corresponding International Application No. PCT/EP2021/065174 (9 pgs.).

\* cited by examiner

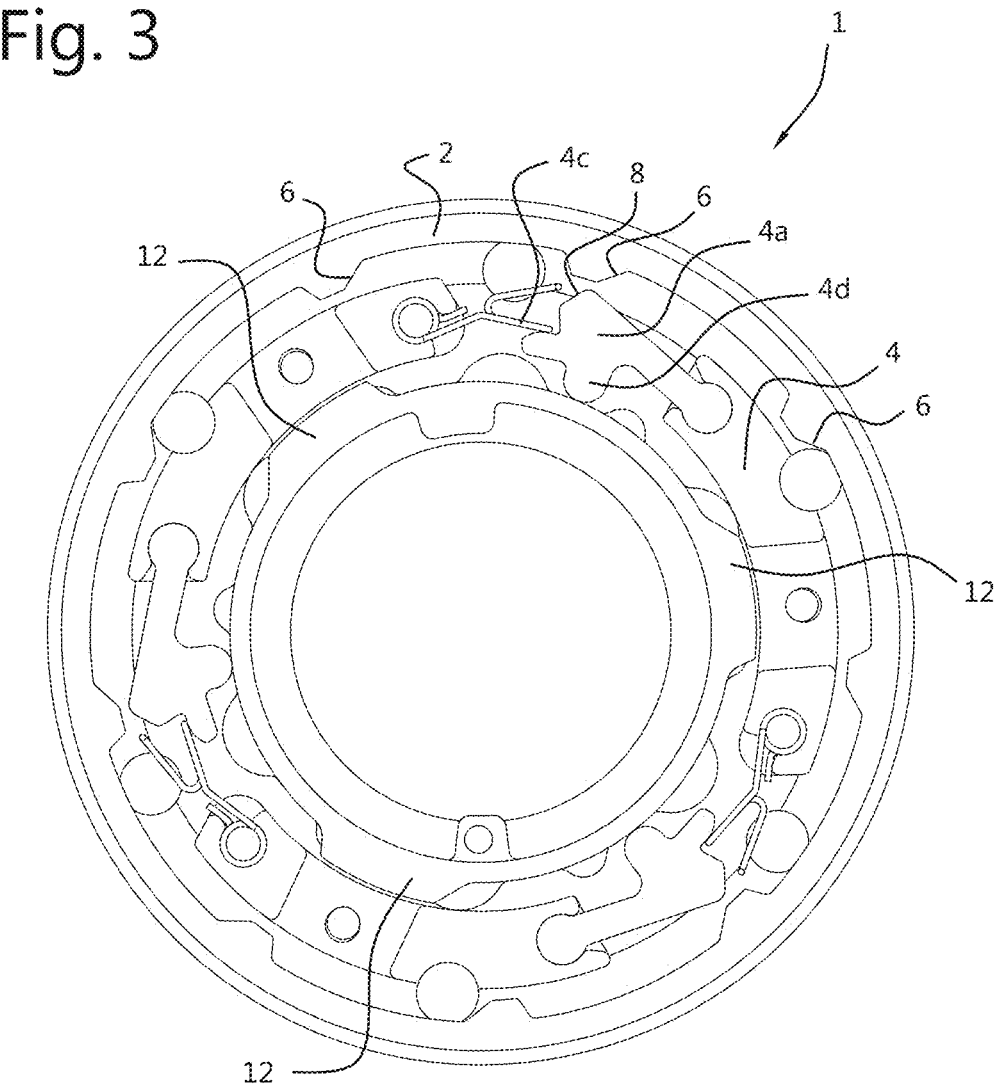

CLUTCH OR BRAKE SYSTEM FOR A TORQUE TRANSMISSION WITH A PLANETARY GEAR

CROSS-REFERENCE TO RELATED APPLICATIONS

This application is a national stage entry of PCT/EP2021/065174, filed Jun. 7, 2021, which claims priority to Netherlands Application No. 2025786, filed Jun. 8, 2020, Netherlands Application No. 2026067, filed Jul. 15, 2020 and Netherlands Application No. 2026514, filed Sep. 22, 2020, the contents of each of which are herein incorporated by reference in their entireties.

FIELD OF THE INVENTION

The invention relates to a clutch or brake system for a torque transmission having an input arranged for connection to a drive source, and an output arranged for connection to a load.

BACKGROUND TO THE INVENTION

Transmission systems, e.g. for vehicles, windmills etc., are known. In bicycles, especially racing bicycles, the transmission system traditionally includes a front derailleur and a rear derailleur, for shifting gears of the transmission system. An alternative to derailleurs is formed by gear hubs, where shifting of gears is accommodated by a gear shifting mechanism inside the, generally rear, wheel hub. A hybrid form is known where a gear hub torque transmission having at least two selectable gear ratios is coupled between the rear wheel hub and the rear sprocket. Herein the rear sprocket can include a plurality of gear wheels, selectable through a rear derailleur. Here the gear hub can take the place of a front derailleur.

Such gear hub gear shifting mechanisms can include one or more planetary gear sets. The planetary gear includes at least three rotational members, such as a sun gear, a planet carrier and a ring gear. A clutch or brake system can be used for selectively coupling two of the rotational members, e.g. the planet carrier and the ring gear. When coupled, the hub gear shifting mechanism operates according to a first gear ratio. When decoupled, the hub gear shifting mechanism operates according to a second gear ratio.

SUMMARY OF THE INVENTION

It is an object to provide a clutch or brake system for a torque transmission which is cost-effective, can be manufactured with a small size, is easy to operate and/or is durable. Alternatively, or additionally, it is an object to provide a clutch or brake system for a torque transmission which can be operated under load, e.g. while pedaling. Alternatively, or additionally, it is an object to provide a clutch or brake system for a torque transmission which can be operated for coupling and for decoupling under load, e.g. while pedaling. Alternatively, or additionally, it is an object to provide a clutch or brake system for a torque transmission which can be operated both for upshifting and for downshifting under load, e.g. while pedaling. More in general it is an object to provide an improved clutch or brake system for a torque transmission, or at least an alternative clutch or brake system for a torque transmission. Optionally, it is an object to provide a clutch or brake system in which lockup can be prevented or at least the risk of lockup can be diminished. Lockup here refers to a fault situation in which rotation of the clutch or brake system is inadvertently prevented.

According to an aspect is provided a clutch or brake system for a torque transmission. Such clutch or brake system can be used in a vehicle, such as a bicycle or car, a windmill, or the like. The clutch or brake system has an input arranged for connection to a drive source, and an output arranged for connection to a load. Preferably, the clutch or brake system is operable under load between the input and the output. More preferably, the clutch or brake system is operable under load between the input and the output both when coupling and when decoupling. Preferably, the clutch or brake system is operable under load between the input and the output both during upshift and downshift of the torque transmission. The clutch or brake system includes a first rotatable unit, e.g. a housing, connectable to the input. The clutch or brake system includes a second rotatable unit connectable to the output. It is also possible that the first rotatable unit is connectable to the output and the second rotatable unit is connectable to the input. The first rotatable unit includes at least one first abutment surface. The second rotatable unit includes at least one second abutment surface arranged for selectively engaging the first abutment surface. The first and second abutment surfaces are adapted to each other so as to allow disengaging under load, e.g. so as to disengage under load, e.g. in two directions. The clutch or brake system includes a third rotatable unit. The third rotatable unit can be arranged for co-rotating with the second rotatable unit. The third rotatable unit includes at least one retaining member. The third rotatable unit is arranged for selectively being in one or more first positions or one or more second positions relative to the second rotatable unit. It will be appreciated that the first positions can be first rotational and/or axial positions, and the second positions can be second, different, rotational and/or axial positions. The at least one retaining member in a first position, of the one or more first positions, locks the at least one second abutment surface in a first disposition, preferably in engagement with the at least one first abutment surface, for rotationally coupling the second rotatable unit to the first rotatable unit. The at least one retaining member in a second position, of the one or more second positions, releases the at least one second abutment surface to a second disposition, preferably for disengagement of the at least one first abutment surface, for decoupling the second rotatable unit from the first rotatable unit.

Hence, while the first and second abutment surfaces are adapted to each other so as to allow disengaging under load, or to disengage under load, the relative positioning of the second and third rotatable units can in a first position lock the at least one second abutment surface in engagement with the at least one first abutment surface, and in a second position release the at least one second abutment surface for disengagement of the at least one first abutment surface. Hence, in a first position of the one or more first positions, the second rotatable unit can be rotationally coupled to the first rotatable unit, and in a second position of the one or more second positions the second rotatable unit can be decoupled from the first rotatable unit.

The third rotatable unit includes at least two actuation members arranged for moving the third rotatable unit from a first position to a second position or from a second position to a first position relative to the second rotatable unit. A first actuation member of the third rotatable unit is arranged for moving the third rotatable unit from a first position to a second position relative to the second rotatable unit. A second actuation member of the third rotatable unit is arranged for moving the third rotatable unit from a second position to a first position relative to the second rotatable unit.

The clutch or brake system includes a fourth unit including a selector, the selector being arranged for selectively being in a first mode or second mode. The selector is arranged for in the first mode gripping the first actuation member for rotating the third rotatable unit from a first position, of the one or more first positions, to a second position, of the one or more second positions, relative to the second rotatable unit. The selector is arranged for in the second mode gripping the second actuation member for rotating the third rotatable unit from a second position, of the one or more second positions, to a first position, of the one or more first positions, relative to the second rotatable unit.

The second rotatable unit includes a retractor member arranged for moving the first and/or second actuation members out of engagement with the selector.

The at least one second abutment surface and the first actuation member are angularly positioned such that while the at least one second abutment surface moves from the second disposition to the first disposition the first actuation member is prevented from being gripped by the selector. Preferably, the at least one second abutment surface and the first actuation member are angularly positioned such that while the at least one second abutment surface moves from the second disposition to the first disposition the first actuation member is prevented from being gripped by the selector in the first mode.

Thus a simple and efficient clutch or brake system can be provided, wherein in particular a risk of lock-up of said system during use is reduced while above-mentioned advantages are maintained. The rotation of the third rotatable unit relative to the second rotatable unit can hereby be prevented in case the second abutment surface is in the process of moving from the disengaged state in the second disposition to the engaged state in the first disposition.

Optionally, the at least one second abutment surface and the first actuation member are positioned such that while the at least one second abutment surface moves from the second disposition to the first disposition the first actuation member is kept out of engagement with the selector by a trailing end of the retractor member. Preferably, the at least one second abutment surface and the first actuation member are positioned such that while the at least one second abutment surface moves from the second disposition to the first disposition the first actuation member is kept out of engagement with the selector in the first mode by a trailing end of the retractor member. Thus, the trailing end of the retractor member can be used for preventing the first actuation member to engage with the selector.

Optionally, the at least one second abutment surface and the first actuation member are positioned such that while the at least one second abutment surface moves from the second disposition to the first disposition the first actuation member rests on the trailing end of the retractor member. Hence the retractor member can physically prevent the first actuation member from engaging with the selector.

Optionally, the at least one second abutment surface and the first actuation member are positioned such that while the at least one second abutment surface moves from the second disposition to the first disposition the first actuation member is biased against a trailing side of the retractor member. Hence, the first actuation member can be retained by friction against the trailing side of the retractor member.

Optionally, the at least one second abutment surface is a gripping member arranged for radially moving, e.g. pivoting, in and out of engagement with the at least one first abutment surface.

Optionally, the at least one second abutment surface and the second actuation member are angularly positioned such that when the at least one gripping member engages a ramp of the at least one retaining member and the at least one second abutment surface of the gripping member engages or is immediately adjacent a radially inner surface of the first unit, the second actuation member is moved out of engagement with the selector by the retractor member. Thus, when lockup might be imminent, the retractor member disengages the second actuation member from the selector for preventing lockup to arise.

Optionally, the first and second actuation members are hingedly connected to the third unit.

Optionally, the first and second actuation members are biased towards the fourth unit by resilient elements. Hence once release the first and second actuation members are biased to engage the selector.

Optionally, the third unit has predefined angular indexing positions with respect to the second unit, such as six predefined indexing positions. The predefined indexing positions help to have the third and second units to assume predefined angular orientations relative to each other. Thus, operation of the clutch or brake system can be made more reliable.

Optionally, the second and/or third units are arranged such that each indexing position has associated therewith an angular biasing area, such that when the second and third units are rotationally within the biasing area relative to each other they are biased into the predefined indexing position. Thus, the second and third units automatically assume one of the predefined angular indexing positions once the second and third units are within an angular range, defined by the biasing area, from the predefined indexing position.

Optionally, the angular indexing positions are such that in at least one of the indexing positions the gripping member is positioned on the top of the retaining member.

Optionally, the angular indexing positions are such that in at least one of the indexing positions the gripping member is positioned on a leading ramp of the retaining member.

Optionally, the third rotatable unit includes a first body and a second body, wherein the first body includes the at least one retaining member, and the second body includes at least one of the at least two actuation members.

Optionally, the third rotatable unit includes at least one retainer, and the second rotatable unit includes at least one notch, or the second rotatable unit includes at least one retainer, and the third rotatable unit includes at least one notch, for indexing the second rotatable unit relative to the third rotatable unit, in one of the predefined angular indexing positions, by resilient engagement of at least one of the at least one retainers in at least one of the at least one notches. Hence, the third rotatable unit can assume a defined angular position relative to the second rotatable unit.

Optionally, the at least one notch has a tapered mouth for biasing the retainer towards the predefined indexing position. Hence, the tapered mouth can form the biasing area.

Optionally, the retainer is hingedly connected to the third rotatable unit, such as for pivoting motion around a pivot axis parallel to the rotational axis of the third rotational unit.

Optionally, the retainer is formed as a pin slidable along an axis parallel to the rotational axis of the third rotational unit. The notch can be an axial depression. The pin can be slidably housed in the third rotational unit, and biased towards the second rotational unit, the second rotational unit having at least one axial depression. The pin can be slidably housed in the second rotational unit, and biased towards the third rotational unit, the third rotational unit having at least one axial depression.

Optionally, the third rotatable unit includes a first body and a second body, wherein the second body includes the second actuation member, and optionally the first actuation member.

Optionally, the first body is rotationally resiliently coupled to the second body.

Optionally, a first force biasing the second and third units towards a predefined angular indexing position, is smaller than a second force biasing the first body relative to the second body.

Optionally, the first and/or second actuation member is positioned to be moved out of engagement with the selector once the second and third units are rotationally within the biasing area relative to each other.

Optionally, the at least one second abutment surface and the first actuation member are angularly positioned such that when the at least one gripping member engages a ramp of the at least one retaining member and the at least one second abutment surface of the gripping member engages or is immediately adjacent a radially inner surface of the first unit, the first actuation member is biased against a trailing side of the retractor member, in particular pushed by a tangential spring force applied by a resilient element arranged between the first and the second body of the third unit.

Optionally, the third rotatable unit is arranged for co-rotating with the second rotatable unit, and the system is arranged for temporarily changing rotation speed of the third rotatable unit relative to the second rotatable unit, e.g. by temporarily speeding up, braking or halting the second and/or third rotatable unit, for rotating from the first position to the second position, or from the second position to the first position.

Optionally, the third rotatable unit is rotatable relative to the second rotatable unit. Optionally a rotation angle of the third rotatable unit relative to the second rotatable unit is more than 360 degrees. Optionally a rotation angle of the third rotatable unit relative to the second rotatable unit is unlimited. The clutch or brake system can be free from stop means limiting the rotation angle of the third rotatable unit relative to the second rotatable unit.

Optionally, the third rotatable unit is arranged to be rotated relative to the second rotatable unit from a first position, of the one or more first positions, to a second position, of the one or more second positions, and from that second position to a first position, of the one or more first positions, in one and the same rotational direction. The third rotatable unit can be rotated relative to the second rotatable unit in a continued forward rotation for being moved from a first position to a second position, and from that second position to a first position. The third rotatable unit can be rotated relative to the second rotatable unit in a continued rearward rotation for being moved from a first position to a second position, and from that second position to a first position.

Optionally, the third rotatable unit is arranged for selectively being in one of a plurality of first or second positions relative to the second rotatable unit. The third rotatable unit in each of the first positions of the plurality of first positions locks the at least one second abutment surface in engagement with the at least one first abutment surface for rotationally coupling the second rotatable unit to the first rotatable unit. The third rotatable unit in each of the second positions of the plurality of second positions releases the at least one second abutment surface for disengagement of the at least one first abutment surface for decoupling the second rotatable unit from the first rotatable unit. The third rotatable unit can be arranged to be rotated relative to the second rotatable unit from a first first position to a first second position, and from the first second position to a second first position in one and the same rotational direction. The third rotatable unit can be arranged to be rotated relative to the second rotatable unit from the second first position to a second second position, and from the second second position to a third first position (or to the first first position) in the same one and the same rotational direction. The first positions of the plurality of first positions can e.g. be equally spaced around the perimeter of the second rotatable unit. The second positions of the plurality of second positions can e.g. be equally spaced around the perimeter of the second rotatable unit. The first positions and second positions can be alternatingly and preferably equally spaced around the perimeter of the second rotatable unit. For example, three first positions and three second positions are alternatingly spaced at 60 degrees around the perimeter of the second rotatable unit.

Optionally, the engagement or disengagement of the second abutment surface with the at least one first abutment surface is independent of input torque and/or rotation speed, but relies only on the second and third rotatable units being in the first or second relative positions.

Optionally, the first and second actuation members are arranged such that when the first actuation member is biased into contact with the selector, the second actuation member is maintained at a distance from the selector and vice versa. This can aid in preventing unwanted noise to be generated.

Optionally, the at least one second abutment surface of the second rotatable unit is hingedly connected to the remainder of the second rotatable unit. Optionally, the at least one second abutment surface of the second rotatable unit is hingedly connected to the remainder of the second rotatable unit so as to have a single pivot axis.

Optionally, the selector includes a groove including partial grooves. In the first mode the partial grooves allow engaging the first actuation member. In the first mode the partial grooves can allow preventing engagement of the second actuation member. In the second mode the partial grooves allow engaging the second actuation member. In the second mode the partial grooves can allow preventing engagement of the first actuation member.

Optionally, the groove includes a first partial groove, a second partial groove and a third partial groove. In the first mode the first and second partial grooves allow, e.g. align for, gripping the first actuation member and optionally for not engaging the second actuation member, and in the second mode the second and third partial grooves allow, e.g. align for, gripping the second actuation member and optionally for not engaging the first actuation member.

Optionally, the first partial groove, the second partial groove and the third partial groove extend on a cylindrical surface of the fourth unit in a direction substantially parallel to an axis of the cylindrical surface.

Optionally, the first partial groove is arranged to be immobile. For example, when the clutch or brake system is used in a wheel axle assembly or bicycle the first partial groove can be arranged immobile relative to a wheel axle of bicycle frame.

Optionally, the second partial groove and the third partial groove are arranged to be moved, e.g. relative to the first partial groove, e.g. displaced tangentially. Optionally, the second and third partial groove are arranged to be moved, e.g. simultaneously, in opposite directions.

Optionally, the second partial groove is arranged for moving in the same direction as the first actuation member when the second partial groove moves from the second mode to the first mode, and the third partial groove is arranged for moving in the same direction as the second actuation member when the third partial groove moves from the first mode to the second mode. Hence, forces on the selector are minimized, and symmetrical for both actuation members.

Optionally, the second and third partial groove are arranged to be moved, e.g. simultaneously, in the same direction. The second and third partial groove can be arranged to be moved in unison. The second and third partial groove can be arranged on a unitary part of the fourth unit. This allows for a sturdy and simple construction.

Optionally, the second partial groove is arranged for moving in the same direction as the first actuation member when the second partial groove moves from the second mode to the first mode, and the third partial groove is arranged for moving in the opposite direction as the second actuation member when the third partial groove moves from the first mode to the second mode.

Optionally, the second and third partial groove are arranged to be moved against an end stop having a predefine position relative to the first partial groove. Thus, the position of the second and third partial grooves relative to the first partial groove can be well defined.

Optionally, the fourth unit includes a plurality of grooves including partial grooves, e.g. three groove shaving partial grooves.

Optionally, the first and second actuation member are arranged for radially moving, e.g. pivoting, in and out of engagement with the fourth unit.

Optionally, the first and/or second abutment surface is biased to disengage. Hence the default for the first and second abutment surfaces is a disengaged mode. The relative position of the third and second rotatable units then determined whether or not the first and second abutment surfaces are engaged or disengaged.

Optionally, the clutch or brake system includes a plurality of first and/or second abutment surfaces, e.g. distributed along a perimeter of the first and/or second rotatable units, respectively. Optionally, the first and/or second abutment surfaces are distributed substantially uniformly along the perimeter of the first and/or second rotatable units, respectively. Optionally the number of first abutment surfaces is equal to the number of second abutment surfaces.

Optionally, the clutch or brake system includes a plurality of retaining members.

Optionally, the first, second, third, and/or fourth unit are coaxial.

Optionally, the fourth unit is positioned at least partially within the third rotatable unit, and/or the third rotatable unit is at least partially positioned within the second rotatable unit, and/or the second rotatable unit is at least partially positioned within the first rotatable unit.

It will be appreciated that the described arrangement of the groove(s) of the selector can also apply to a clutch or brake system for a torque transmission having an input arranged for connection to a drive source, and an output arranged for connection to a load, the clutch system including a first rotatable unit connectable to the input or output, including at least one first abutment surface; a second rotatable unit connectable to the output or input, respectively, including at least one second abutment surface arranged for selectively engaging the first abutment surface, the first and second abutment surfaces being adapted to each other so as to allow disengaging under load, e.g. in two directions; a third rotatable unit including at least one retaining member, the third unit being arranged for selectively being in one of one or more first rotational positions or one of one or more second rotational positions relative to the second rotatable unit, wherein the at least one retaining member in a first rotational position locks the at least one second abutment surface in a first disposition for rotationally coupling the second unit to the first unit, and in a second rotational position releases the at least one second abutment surface to a second disposition for decoupling the second unit from the first unit; wherein the third rotatable unit includes a first actuation member arranged for moving the third rotatable unit from a first position to a second position and a second actuation member arranged for moving the third rotatable unit from a second position to a first position relative to the second rotatable unit; a fourth unit including a selector, the selector being arranged for selectively being in a first mode or second mode, the selector in the first mode being arranged for gripping the first actuation member for rotating the third rotatable unit from a first position to a second position relative to the second rotatable unit; the selector in the second mode being arranged for gripping the second actuation member for rotating the third rotatable unit from a second position to a first position relative to the second rotatable unit.

According to an aspect is provided a torque transmission, including a clutch or brake system, for instance as described herein, and a planetary gear. The clutch or brake system can be arranged in the torque transmission so as to selectively couple two of a sun gear, a planet carrier and a ring gear of the planetary gear. Optionally, the clutch or brake system is arranged in the torque transmission so as to selectively couple the planet carrier and the ring gear.

Optionally, the ring gear is rotationally fixed to the first rotational unit and the planet carrier is rotationally fixed to the second rotational unit, or the ring gear is rotationally fixed to the second rotational unit and the planet carrier is rotationally fixed to the first rotational unit.

Optionally, the sun gear is connected to the fourth unit via a one way bearing.

Optionally, the one way bearing is arranged to allow rotation of the sun gear in forward direction with respect to the fourth unit.

Optionally, the one way bearing is arranged to allow rotation of the sun gear with respect to the fourth unit with minimum friction and/or minimum noise.

Optionally, the one way bearing is arranged to lock rotation of the sun gear in backward direction with respect to the fourth unit.

Optionally, the one way bearing is arranged to allow a torque of up to 118 Nm, and/or prevent slip.

Optionally, the one way bearing is a radial one-way bearing with rollers or with ratchet teeth.

Optionally, the one way bearing is an axial one-way bearing with rollers or with ratchet teeth.

According to an aspect is provided a wheel axle assembly, such as a bicycle wheel axle assembly, including the torque transmission.

Optionally, an axle of the wheel axle assembly is rotationally fixed to the fourth unit.

Optionally, a driver body is connected to the first rotational unit or the second rotational unit.

The wheel axle assembly can be arranged for receiving a cassette having a plurality of gear wheels.

According to an aspect is provided a bicycle wheel hub including a clutch or brake system as described herein. The bicycle wheel hub can include a torque transmission, as described. Optionally, the wheel hub is arranged for receiving a cassette having a plurality of gear wheels.

According to an aspect is provided a bicycle including a clutch or brake system as described herein. The bicycle can include a torque transmission, including a clutch or brake system as described herein and a planetary gear. The clutch or brake system can be arranged in the torque transmission so as to selectively couple two of the sun gear, the planet carrier and the ring gear. Optionally, the clutch or brake system is arranged in the torque transmission so as to selectively couple the planet carrier and the ring gear. Optionally, the torque transmission is included in a rear wheel hub of the bicycle. Optionally, a rear cassette having a plurality of gear wheels is attached to the rear wheel hub. The bicycle can include a rear derailleur for selecting one of the plurality of gear wheels of the rear pinion. Optionally, the bicycle includes one single front pinion. In such case, the torque transmission can emulate functioning of a front derailleur.

According to an aspect is provided a method for operating a clutch or brake system for a torque transmission. Such method can be practiced in a vehicle, such as a bicycle or car, a windmill or the like. The clutch or brake system has an input arranged for connection to a drive source, and an output arranged for connection to a load. Preferably, the clutch or brake system is operable under load between the input and the output. More preferably, the clutch or brake system is operable under load between the input and the output both when coupling and when decoupling. Preferably, the clutch or brake system is operable under load between the input and the output both during upshift and downshift of the torque transmission. The method includes providing a clutch or brake system as described herein. The method includes rotating the third rotatable unit relative to the second rotatable unit from a first rotational position, of the one or more first rotational positions, to a second rotational position, of the one or more second rotational positions, for disengaging the clutch or brake system, and rotating the third rotatable unit relative to the second rotatable unit from a second rotational position, of the one or more second rotational positions, to a first rotational position, of the one or more first rotational positions, for engaging the clutch or brake system.

Optionally, the method includes having the third rotatable unit co-rotate with the second rotatable unit, and temporarily changing rotation speed of the third rotatable unit relative to the second rotatable unit, e.g. by temporarily speeding up, braking or halting the second and/or third rotatable unit, for rotating the third rotatable unit from a first position, of the one or more first rotational positions, to a second position, of the one or more second rotational positions, or from a second position, of the one or more second rotational positions, to a first position, of the one or more first rotational positions, relative to the second rotatable unit.

Optionally, the method includes automatically resuming co-rotation of the third rotatable unit with the second rotatable unit after the third rotatable unit has been rotated from a first rotational position, of the one or more first rotational positions, to a second rotational position, of the one or more second rotational positions, or vice versa.

According to an aspect is provided a method for operating a clutch or brake system for a torque transmission. Such method can be practiced in a vehicle, such as a bicycle or car, a windmill or the like. The clutch or brake system has an input arranged for connection to a drive source, and an output arranged for connection to a load. Preferably, the clutch or brake system is operable under load between the input and the output. More preferably, the clutch or brake system is operable under load between the input and the output both when coupling and when decoupling. Preferably, the clutch or brake system is operable under load between the input and the output both during upshift and downshift of the torque transmission. The method includes providing a clutch or brake system as described herein. The method includes temporarily changing rotation speed of the third rotatable unit relative to the second rotatable unit, e.g. by temporarily speeding up, braking or halting the second and/or third rotatable unit, for rotating the third rotatable unit from a first rotational position, of the one or more first rotational positions, to a second rotational position, of the one or more second rotational positions, or from a second rotational position, of the one or more second rotational positions, to a first rotational position, of the one or more first rotational positions, relative to the second rotatable unit.

Optionally, the method includes rotating the third rotatable unit from a first rotational position, of the one or more first rotational positions, to a second rotational position, of the one or more second rotational positions, and from a second rotational position, of the one or more second rotational positions, to a first rotational position, of the one or more first rotational positions, in one and the same rotational direction.

Optionally, the method includes with the selector in the first mode gripping the first actuation member for rotating the third rotatable unit from a first rotational position, of the one or more first rotational positions, to a second rotational position, of the one or more second rotational positions, and with the selector in the second mode gripping the second actuation member for rotating the third rotatable unit from a second rotational position, of the one or more second rotational positions, to a first rotational position, of the one or more first rotational positions.

According to an aspect is provided a method for operating a clutch or brake system for a torque transmission. Such method can be practiced in a vehicle, such as a bicycle or car, a windmill or the like. The clutch or brake system has an input arranged for connection to a drive source, and an output arranged for connection to a load. Preferably, the clutch or brake system is operable under load between the input and the output. More preferably, the clutch or brake system is operable under load between the input and the output both when coupling and when decoupling. Preferably, the clutch or brake system is operable under load between the input and the output both during upshift and downshift of the torque transmission. The method includes providing a clutch or brake system as described herein. The method includes with the selector in the first mode gripping the first actuation member for rotating the third rotatable unit from a first rotational position, of the one or more first rotational positions, to a second rotational position, of the one or more second rotational positions, and with the selector in the second mode gripping the second actuation member for rotating the third rotatable unit from a second rotational position, of the one or more second rotational positions, to a first rotational position, of the one or more first rotational positions.

Optionally, the method includes in a first rotational position, of the one or more first rotational positions, locking the at least one second abutment surface for rotationally coupling the second rotatable unit to the first rotatable unit, and in a second rotational position, of the one or more second rotational positions, releasing the at least one second abutment surface for decoupling the second rotatable unit from the first rotatable unit.

Optionally, the first and/or second actuation member is biased into contact with the selector.

Optionally, the method includes, e.g. actively, moving the first actuation member out of engagement with the selector after the third rotatable unit has been rotated from a first rotational position, of the one or more first rotational positions, to a second rotational position, of the one or more second rotational positions, and/or moving the second actuation member out of engagement with the selector after the third rotatable unit has been rotated from a second rotational position, of the one or more second rotational positions, to a first rotational position, of the one or more first rotational positions.

Optionally, the selector includes a groove including partial grooves, and the method includes in the first mode allowing, e.g. aligning, the partial grooves to engage the first actuation member and prevent engagement of the second actuation member, and in the second mode allowing, e.g. aligning, the partial grooves to engage the second actuation member and prevent engagement of the first actuation member.

Optionally, when the first actuation member is in contact with the selector, the second actuation member maintained at a distance from the selector and vice versa, and the method includes selectively setting the selector in the first mode or in the second mode, wherein in the first mode the selector is in gripping mode for the first actuation member and in non-gripping mode for the second actuation member, and in the second mode the selector is in non-gripping mode for the first actuation member and in gripping mode for the second actuation member.

Optionally, the selector includes a groove including a first partial groove, a second partial groove and a third partial groove, wherein in the first mode the first and second partial grooves allow, e.g. align for, gripping the first actuation member and optionally not engaging the second actuation member, and in the second mode the second and third grooves allow, e.g. align for, gripping the second actuation member and optionally not engaging the first actuation member.

Optionally, the method includes moving the second and third partial grooves, e.g. simultaneously, in opposite directions.

Optionally, the method includes moving the second partial groove in the same direction as the first actuation member when the second partial groove moves from the second mode to the first mode, and moving the third partial groove in the same direction as the second actuation member when the third partial groove moves from the first mode to the second mode.

It will be appreciated that any one or more of the above aspects, features and options can be combined. It will be appreciated that any one of the options described in view of one of the aspects can be applied equally to any of the other aspects. It will also be clear that all aspects, features and options described in view of the clutch or brake system apply equally to the method, and vice versa.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing:

FIG. 3 shows an example of a clutch or brake system.

DETAILED DESCRIPTION

Figure 1:
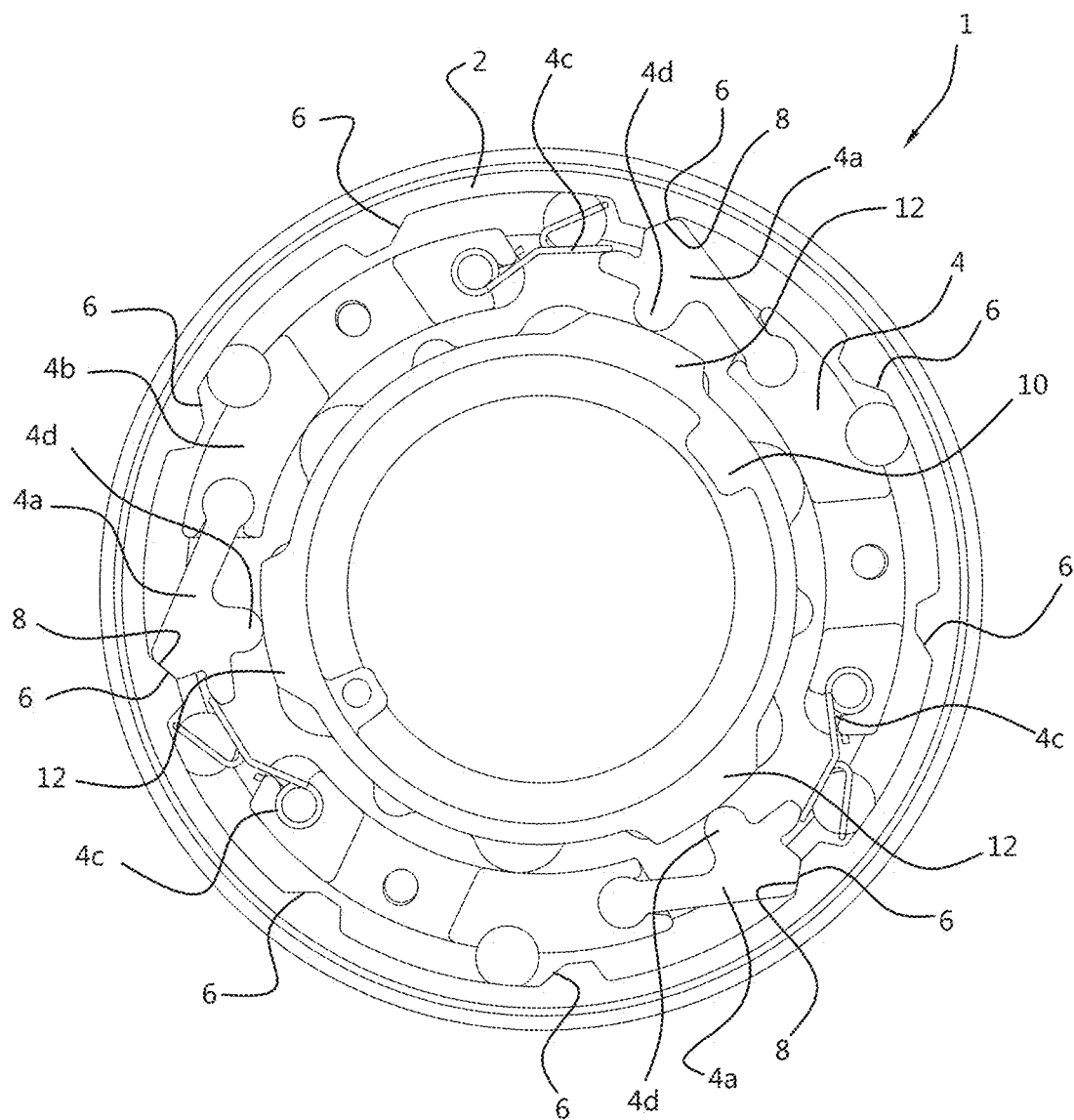
FIG. 1 shows an example of a clutch or brake system.
Figure 2:
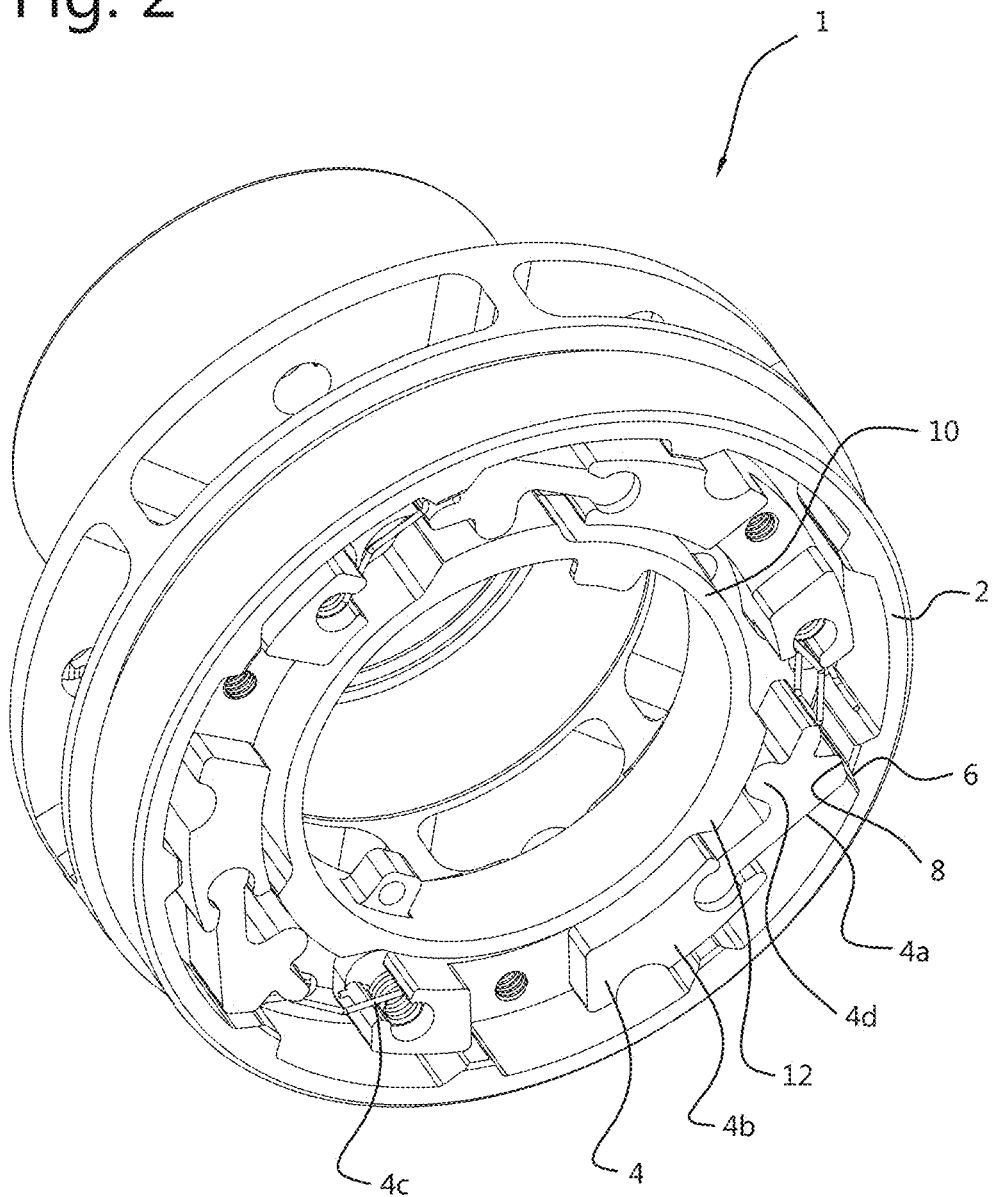
FIG. 2 shows an example of a clutch or brake system.

FIGS. 1, 2 and 3 show an example of a clutch or brake system 1. The clutch or brake system 1 of this example is for use in a torque transmission of a bicycle, however, other fields of use can be envisioned. The clutch or brake system 1 has an input arranged for connection to a drive source, such as pedals or a chain/belt. The clutch or brake system has an output arranged for connection to a load, such as a rear wheel hub. The exemplary clutch or brake system 1 is operable under load between the input and the output, e.g. while pedaling. Hence, the clutch or brake system 1 can be coupled or decoupled under load. Here, the clutch or brake system is operable under load between the input and the output both during upshift and downshift of the torque transmission.

The clutch or brake system in FIGS. 1, 2 and 3 includes a first rotatable unit 2. The first rotatable unit 2 is arranged to be connected to the input. Here, the first rotatable unit 2 is designed as a housing part of the clutch or brake system 1. The clutch or brake system 1 includes a second rotatable unit 4. The second rotatable unit 4 is arranged to be connected to the output. The first rotatable unit 2 includes at least one first abutment surface 6. In this example, the first rotatable unit 2 includes nine first abutment surfaces 6, here evenly distributed along the perimeter of the first rotatable unit 2 at 40 degrees mutual spacing. The second rotatable unit 4 includes at least one second abutment surface 8. In this example, the second rotatable unit 4 includes three second abutment surfaces 8, here evenly distributed along the perimeter of the second rotatable unit 4 at 120 degrees mutual spacing. It will be appreciated that in this example the second rotatable unit 4 includes a plurality of gripping members 4a, here embodied as separate parts hingedly connected to a body portion 4b of the second rotatable unit 4. In this example, the second abutments surfaces 8 are part of the gripping members 4a of the second rotatable unit 4. The second abutment surfaces 8, here the gripping members 4a, are each arranged for selectively engaging one of the first abutment surfaces 6. In the example of FIG. 1 it can be seen that the first and second abutment surfaces are oriented at an angle relative to a radial direction of the first and second rotatable units, respectively. This allows the first and second abutment surfaces are to disengaging under load. In this example, the second rotatable unit 4 includes resilient members 4c, here helical springs, arranged so as to bias the second abutment surfaces 8 out of engagement with the first abutment surfaces 6.

The clutch or brake system 1 in FIGS. 1, 2 and 3 includes a third rotatable unit 10. The third rotatable unit 10 is arranged for co-rotating with the second rotatable unit 4. That is, in use, when the output is rotating (e.g. when the driven wheel of the bicycle is rotating), i.e. when the second rotatable unit 4 is rotating, the third rotatable unit 10 generally co-rotates with the second rotatable unit 4.

The third rotatable unit 10 includes at least one retaining member 12. In this example, the third rotatable unit 10 includes three retaining members 12, here evenly distributed along the perimeter of the third rotatable unit 10 at 120 degrees mutual spacing. The third rotatable unit 10 is arranged for selectively being in a first position (see FIG. 1) or a second position (see FIG. 3) relative to the second rotatable unit 4. It will be appreciated that in this example the first position is a first rotational position, and the second position is a second, different, rotational position.

In the first position (shown in FIG. 1), the retaining members 12 are positioned rotationally aligned with, here under, cams 4d of the gripping members 4a. Thus, in the first position, the gripping members 4a are forced to be pivoted in a radially outer position. In the first position, the second abutment surfaces 8 are positioned to be touching or close to the first abutment surfaces 6. The presence of the retaining members 12 under the cams 4a prevents the second abutment surfaces from being pivoted radially inwards sufficiently to disengage from the first abutment surfaces 6. Hence, the retaining members 12 in the first position lock the second abutment surfaces 8 in engagement with the first abutment surfaces 6. As the second abutment surfaces 8 are locked in engagement with the first abutment surfaces 6, the second rotatable unit 4 is rotationally coupled to the first rotatable unit 2.

In the second position (shown in FIG. 3), the retaining members 12 are positioned rotationally not aligned with, here out of the reach of, the cams 4d of the gripping members 4a. Thus, in the second position, the gripping members 4a are free to pivot to a radially inner position. In this example, the biasing force of the resilient members 4c pivots the second abutment surfaces 8 radially inwards sufficiently to disengage from the first abutment surfaces 6. As a result, the first rotatable unit 2 is free to rotate independently of the second rotatable unit 4. Thus, the second rotatable unit 4 is decoupled from the first rotatable unit 2.

Hence, while the first abutment surfaces 6 and second abutment surfaces 8 are adapted to each other so as to allow disengaging under load, or to disengage under load, the relative positioning of the second rotatable unit 4 and the third rotatable unit 10 can selectively in the first position lock the second abutment surfaces 8 in engagement with the first abutment surfaces 6, and in the second position release the second abutment surfaces 8 for disengagement from the first abutment surfaces 6. It will be appreciated that while the first rotatable unit 2 and second rotatable unit 4 are decoupled, rotating the third rotatable unit 10 from the first position to the second position relative to the second rotatable unit 4, will couple the first and second rotatable units. While the first rotatable unit 2 and second rotatable unit 4 are coupled, rotating the third rotatable unit 10 from the second position to the first position relative to the second rotatable unit 4, will decouple the first and second rotatable units.

Changing the position of the third rotatable unit 10 relative to the second rotatable unit 4 from the first position to the second position, or vice versa, can be performed in many different ways. Changing the position of the third rotatable unit 10 relative to the second rotatable unit 4 from the first position to the second position can be performed by rotating the third rotatable unit 10 relative to the second rotatable unit 4 in a forward direction, and changing the position of the third rotatable unit 10 relative to the second rotatable unit 4 from the second position to the first position can be performed by rotating the third rotatable unit 10 relative to the second rotatable unit 4 in an opposite, rearward direction. It is also possible to rotate the third rotatable unit 10 relative to the second rotatable unit 4 from the first position to the second position, and from the second position to the first position in one and the same rotational direction.

An actuator can be provided for rotating the third rotatable unit and/or the second rotatable unit from the first position to the second position, and/or from the second position to the first position.

In the example of FIGS. 1, 2 and 3, the third rotatable unit 10 is arranged for co-rotating with the second rotatable unit 4. Therefore, changing the position of the third rotatable unit 10 relative to the second rotatable unit 4 from the first position to the second position, or vice versa, can be performed by temporarily changing rotation speed of the third rotatable unit relative to the second rotatable unit, e.g. by temporarily speeding up, braking or halting the second and/or third rotatable unit, for rotating from the first position to the second position, or from the second position to the first position.

In the example of FIGS. 1, 2 and 3, the third rotatable unit 10 is freely rotatable relative to the second rotatable unit 4. There is no limit to the rotational displacement of the third rotatable unit 10 relative to the second rotatable unit 4. In this example, the third rotatable unit 10 is arranged for selectively being in one of a plurality of first positions or one of a plurality of second positions relative to the second rotatable unit. Each of the first positions of the plurality of first positions is defined by the third rotatable unit 10 being positioned to lock the second abutment surfaces 8 in engagement with the first abutment surfaces 6 for rotationally coupling the second rotatable unit 4 to the first rotatable unit 2. In this example there are three gripping members 4a and three retaining members 12, so there are three distinct first positions. Here, the three first positions are evenly distributed along the perimeter of the second rotatable unit 4 at 120 degrees mutual spacing. Each of the second positions of the plurality of second positions is defined by the third rotatable unit 10 being positioned to release the second abutment surfaces 8 from engagement with the first abutment surfaces 6 for rotationally decoupling the second rotatable unit 4 from the first rotatable unit 2. In this example there are three gripping members 4a and three retaining members 12, so there are three second positions. Here, the three second positions can be seen as evenly distributed along the perimeter of the second rotatable unit 4 at 120 degrees mutual spacing. It will be appreciated that the three first positions and three second positions are alternatingly placed along the perimeter of the second rotatable unit 4. For example, the three first positions and three second positions are alternatingly spaced at 60 degrees around the perimeter of the second rotatable unit.

Here, the third rotatable unit 10 can be rotated relative to the second rotatable unit 4 from a first first position to a first second position, from the first second position to a second first position, from the second first position to a second second position, from the second second position to a third first position, from the third first position to a third second position, and from the third second position to the first first position in one and the same rotational direction. The clutch or brake system 1 can be arranged for temporarily changing rotation speed of the third rotatable unit 10 relative to the second rotatable unit 4, e.g. by temporarily speeding up, braking or halting the second and/or third rotatable unit, for rotating from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions). Hence, the second and third rotatable units can in a simple manner be rotated from a first position to a second position or vice versa.

FIGS. 4*a*, 4*b*, 4*c* and 5 show an example of a mechanism for moving the third rotatable unit 10 from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second rotatable unit.

The third rotatable unit 10 includes at least one, here two, actuation member 10*a* arranged for moving the third rotatable unit 10 from a first position to a second position or from a second position to a first position relative to the second rotatable unit 4. The actuation members 10*a* are hingedly connected to a body portion 10*b* of the third rotatable unit 10. In this example, the body portion 10*b* of the third rotatable unit 10 includes an first body portion 10*b*1 and a second body portion 10*b*2. The first body portion 10*b*1 hingedly receives the actuation members 10*a*. The second body portion 10*b*2 includes the retaining members 12. The first body portion 10*b*1 is rotatable relative to the second body portion 10*b*2, here over an angular stroke S. The first and second body portions 10*b*1, 10*b*2 are biased in abutment with a resilient element 10*c*, here a tension spring. This allows the first and second body portions to rotate relative to each other. For example, when the retaining member 12 can not yet push the gripping member 4*a* radially outwardly in abutment with the first abutment surface 6 the resilient element 10*c* allows the first body portion 10*b*1 to rotate relative to the first rotatable unit 2 while the second body portion 10*b*2 does not rotate relative to the first rotatable unit 2.

In FIGS. 4*a*, 4*b*, 4*c* and 5 the clutch or brake system 1 further includes a, here non-rotatable, fourth unit 16. The fourth unit 16 can be arranged to be non-rotatably mounted to a frame of the bicycle. The fourth unit 16 is further shown in FIGS. 6 and 7. The fourth unit 16 includes a selector 18. The selector 18 is arranged for selectively being in a first mode or second mode.

Figure 4A:
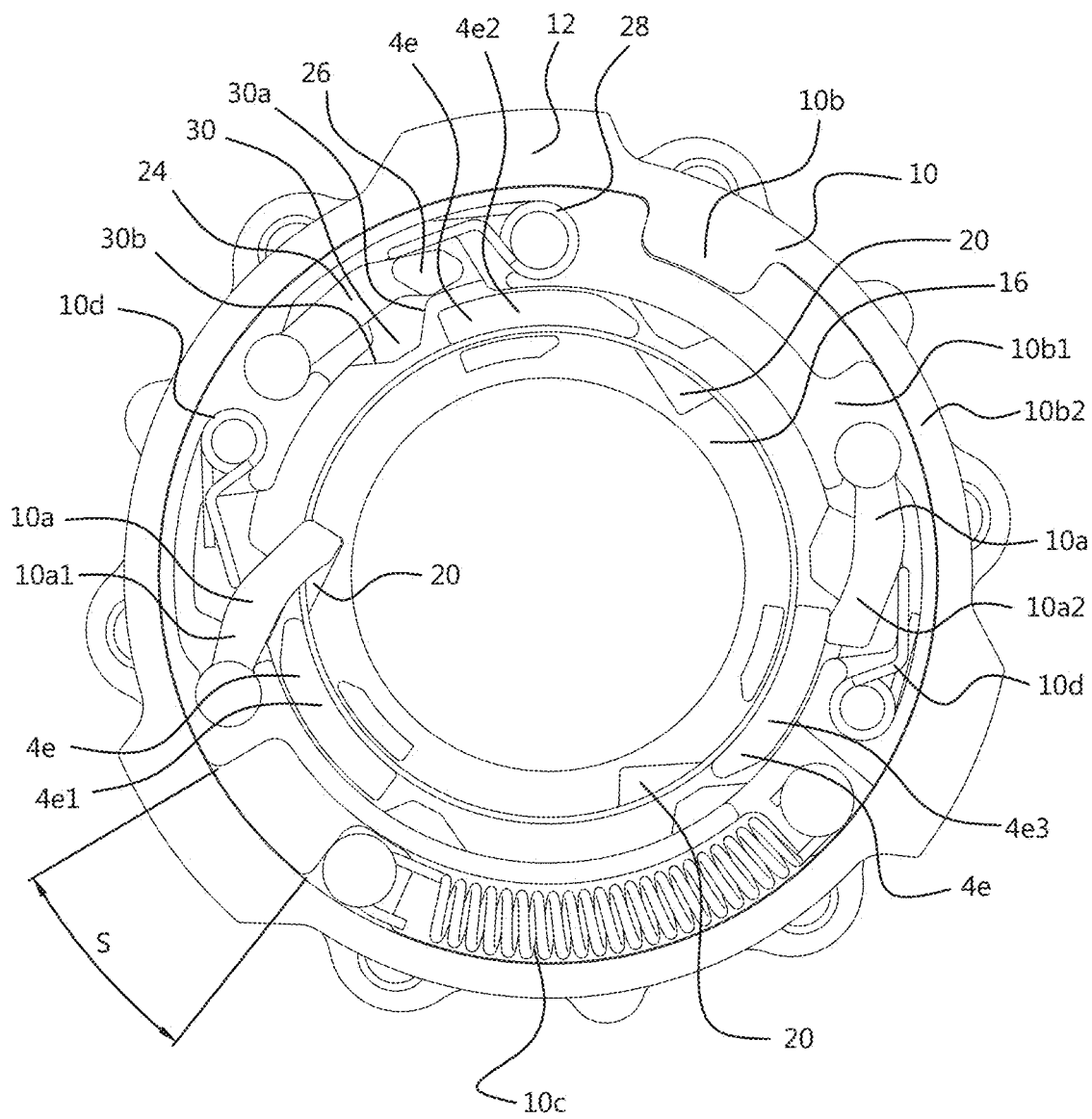
FIGS. 4a, 4b and 4c show an example of a clutch or brake system.

As shown in FIGS. 4*a*-7, 16 and 17, here the third rotatable body 10 includes two actuation members 10*a*. In this example, the actuation members 10*a* are biased towards the fourth unit 16 by resilient elements 10*d*, here helical springs. In this example, the second rotatable unit 4 includes three retractor members 4*e*. the retractor members 4*e* co-rotate with the body portion 4*b* of the second rotatable unit 4. The retractor members 4*e* can e.g. be fixedly connected to, or integral with, the body portion 4*b*. As can be seen in FIG. 4*a*, one of the retractor members 4*e*, here 4*e*1, allows a first actuation member 10*a*1 to engage the fourth unit 16, while another one of the retractor members 4*e*, here 4*e*3, prevents a second actuation member 10*a*2 to engage the fourth unit 16. Hence, when the first actuation member 10*a*1 is biased into contact with the selector 18, the second actuation member 10*a*2 is maintained at a distance from, e.g. non-engaged by, the selector 18, and vice versa.

Figure 4B:
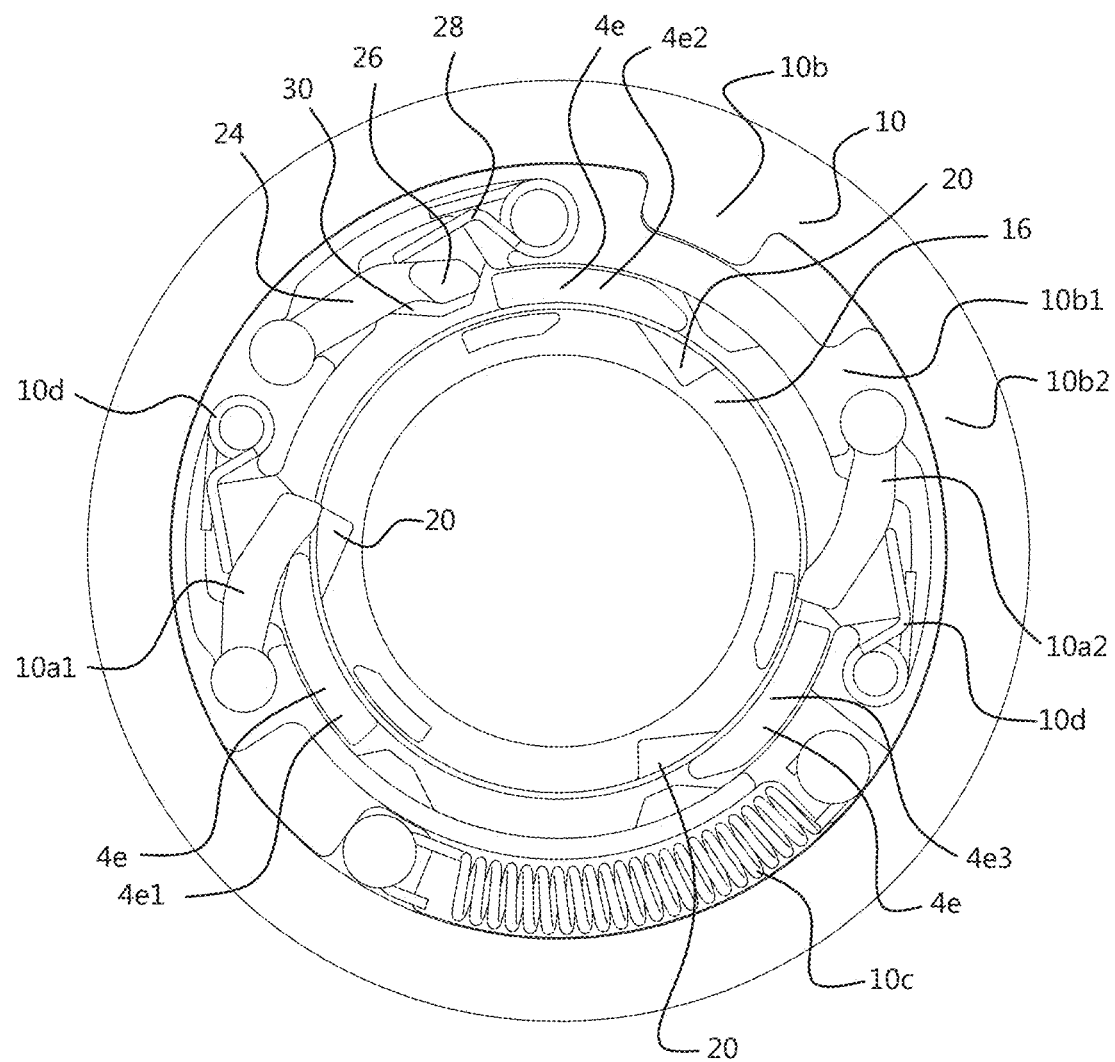
Figure 4C:
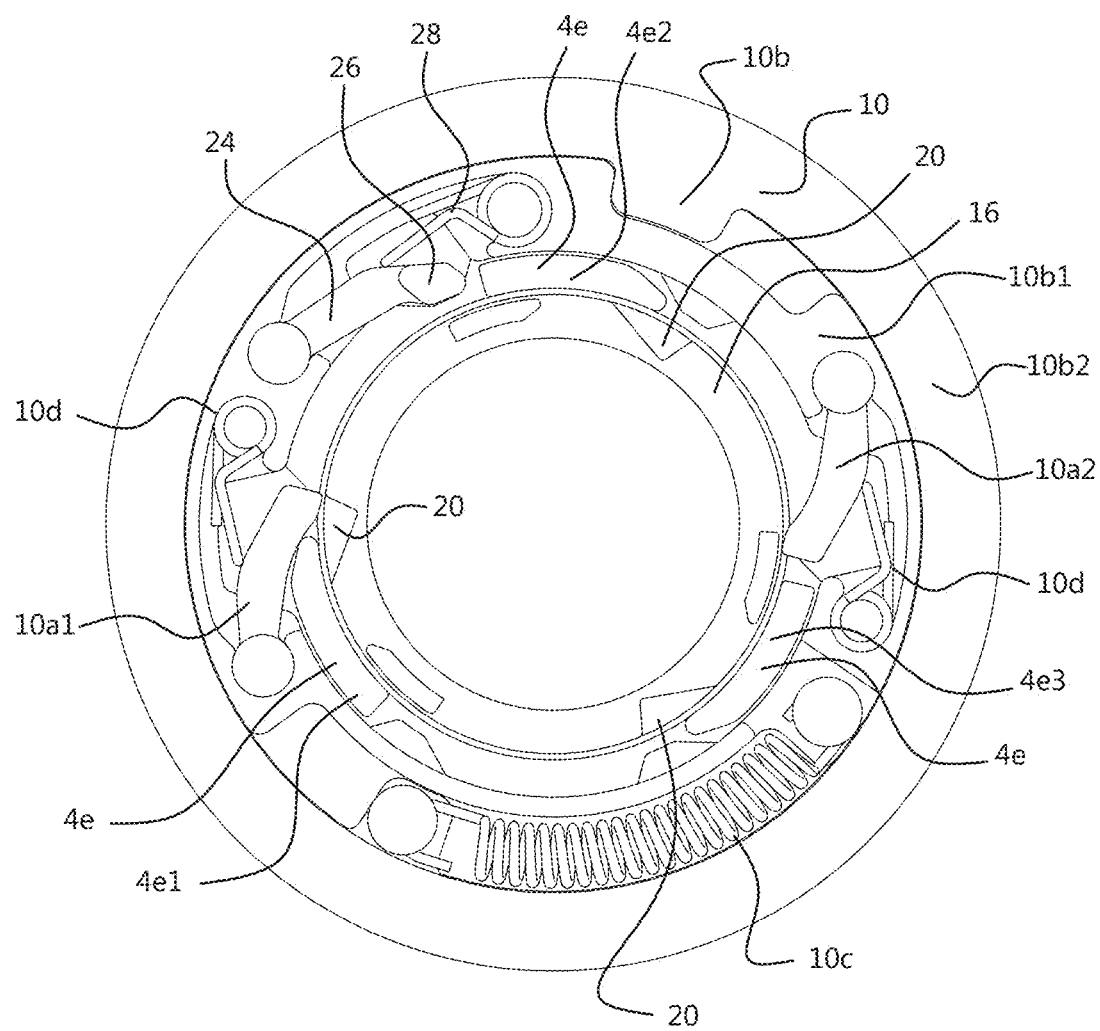
Figure 5:
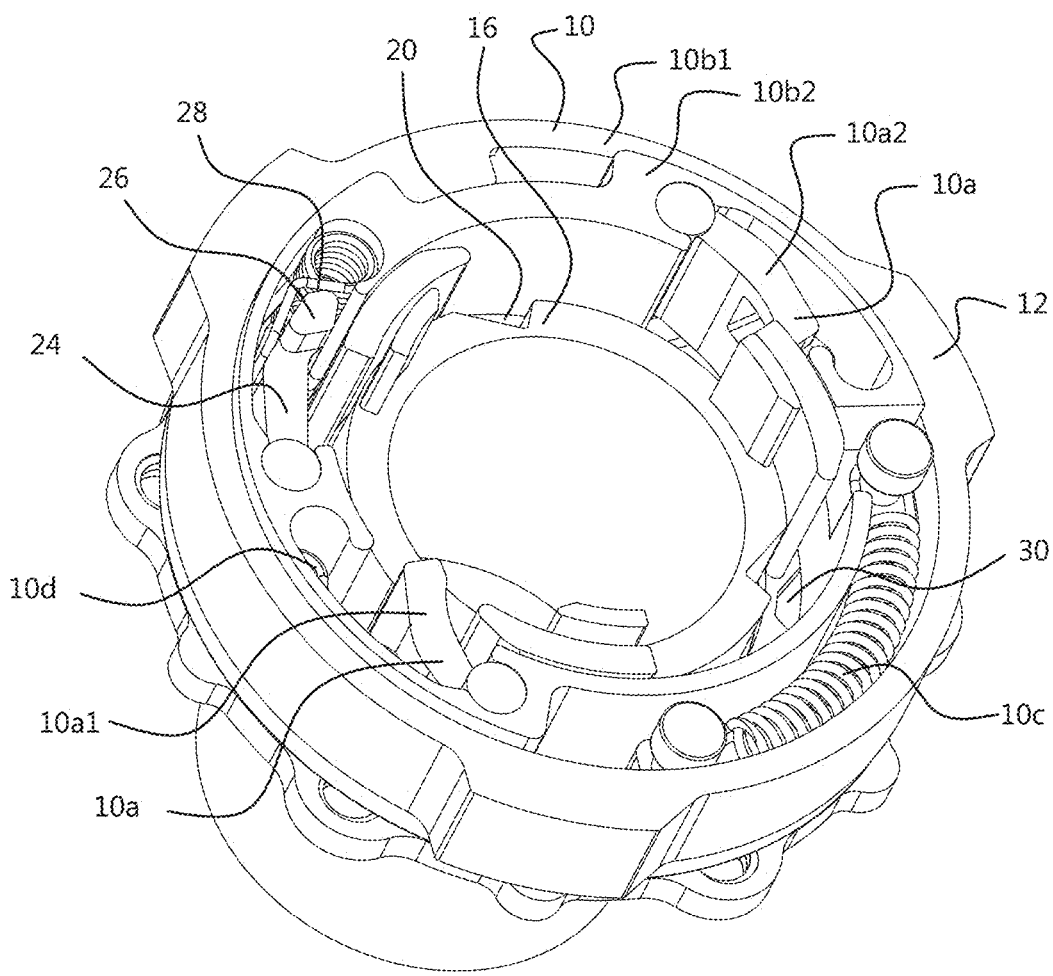
FIG. 5 shows an example of a clutch or brake system.
Figure 6:
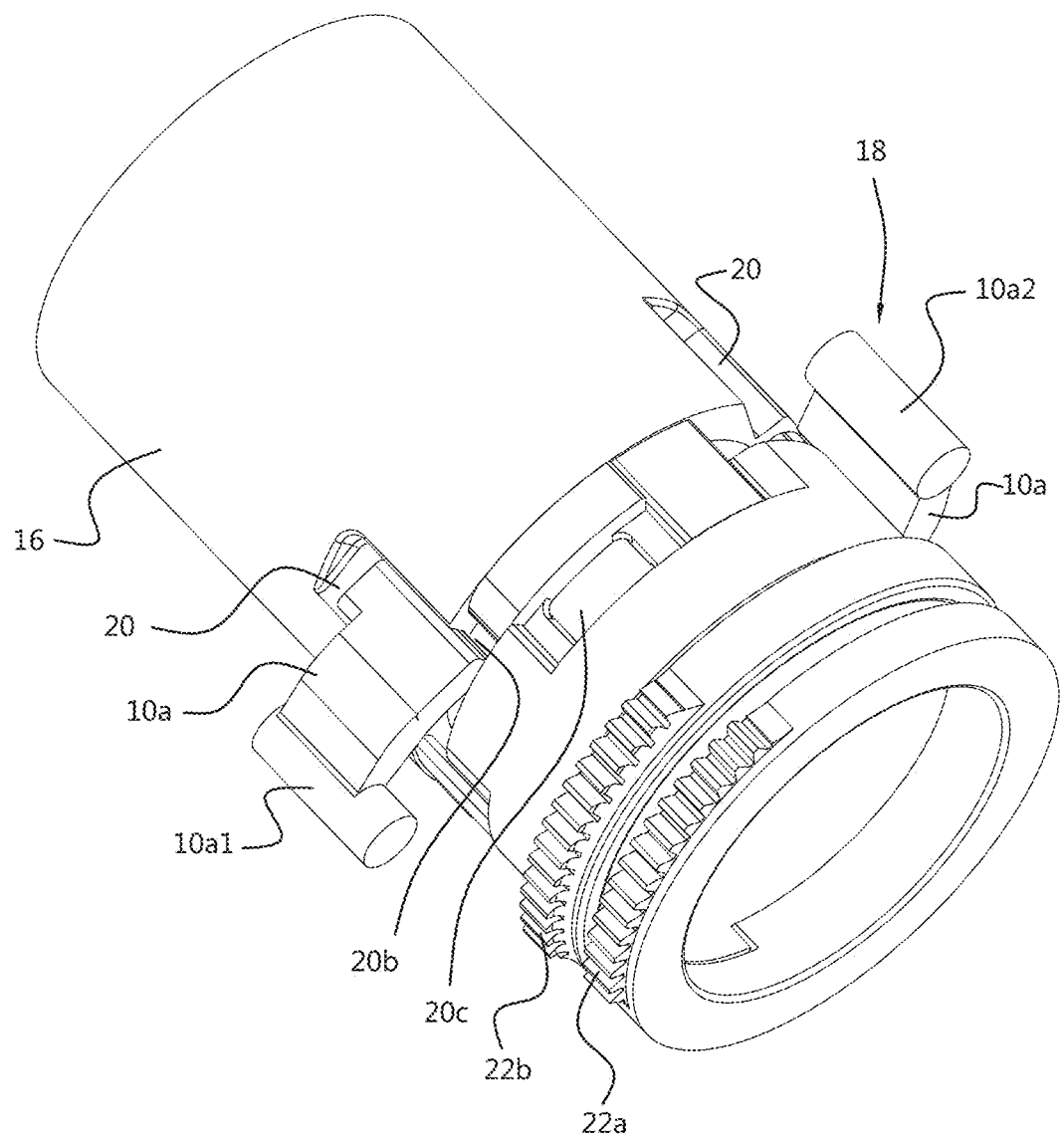
FIG. 6 shows an example of a clutch or brake system.
Figure 7:
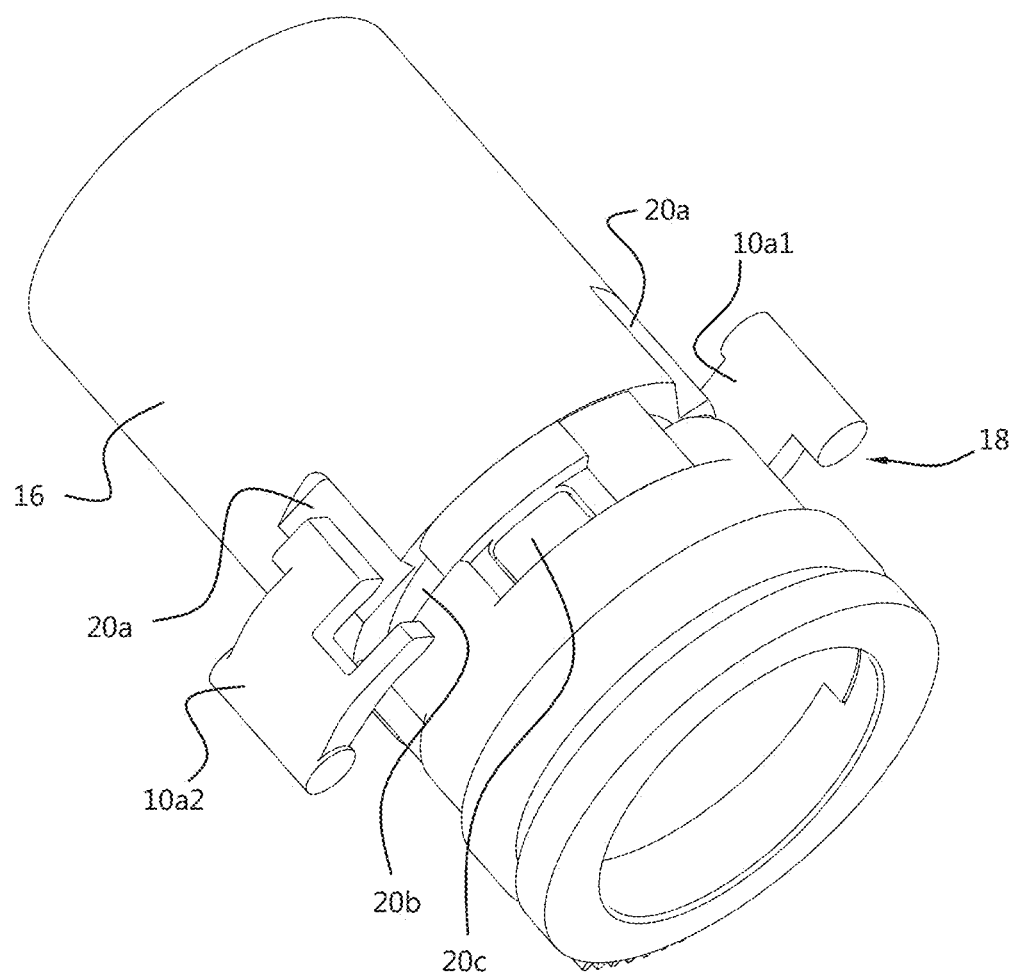
FIG. 7 shows an example of a clutch or brake system.

As shown in FIGS. 6 and 7, in this example the selector 18 includes a groove 20. In this example, the groove 20 includes a first partial groove 20*a*, a second partial groove 20*b* and a third partial groove 20*c*. In the first mode the first partial groove 20*a* and second partial groove 20*b* align as shown in FIGS. 6 and 7. It is noted that in this first mode the third partial groove 20*c* does not align with the first partial groove 20*a*. In the second mode the first partial groove 20*a* and third partial groove 20*c* align. It is noted that in this second mode the second partial groove 20*b* does not align with the first partial groove 20*a*. As can be seen in FIG. 6, the first and second partial grooves 20*a*, 20*b* aligning, allows the first actuation member 10*a*1 to enter into the first partial groove 20*a*, as can also be seen in FIG. 4*a*. It will be noted that in this example the shape of the first actuation member 10*a*1, requires the first partial groove 20*a* and the second partial groove 20*b* to align for allowing the first actuation member 10*a*1 to enter the first partial groove 20*a*. The first partial groove 20*a* then supports the first actuation member 10*a*1, allowing a force to be guided from the fourth unit 16 via the first actuation member 10*a*1 to the third rotatable unit 10. As a result, the third rotatable unit 10 will be halted, and when, in use, the second rotatable unit 4 will remain rotating, the third rotatable unit 10 will be rotated relative to the second rotatable unit 4. When the second rotatable unit 4 has rotated over approximately 60 degrees after gripping of the first actuation member 10*a*1 by the first partial groove 20*a*, the retractor member 4*e*1 knocks the first actuation member 10*a*1 out of the first partial groove 20*a*, as can be seen in FIGS. 4*b* and 4*c*, and the third rotatable unit 10 resumes co-rotating with the second rotatable unit 4.

In this example, the third rotatable unit 10 includes a retainer 24. In this example, the retainer 24 is hingedly connected to the body portion 10*b* of the third rotatable unit 10. Here, the retainer 24 includes a tooth 26. The tooth 26 is biased by a resilient element, here a spring 28. The second rotatable unit 4 includes a, here three, notch 30. Here the notch 30 has an angled face 30*a*. As can be seen in FIG. 4*b*, when the retractor member 4*e*1 has knocked the first actuation member 10*a*1 out of the first partial groove 20*a* the tooth 26 of the retainer 24 is on the angled face 30*a* of the notch 30. Due to the biasing force of the resilient element 28, the tooth 26 is pushed along the angled face 30*a* to the bottom of the notch 30, as can be seen in FIG. 4*b*. As a result, the third rotatable unit 10 assumes a defined angular position relative to the second rotatable unit 4. Also, the slight angular movement from the situation shown in FIG. 4*b*, with the actuation member 10a1 just freed from the groove 20, to the situation shown in FIG. 4c, enables that the retractor member 4e1 lifts the actuation member 10a1 away from the groove 20, so that mechanical contact between the actuation member 10a1 and the fourth unit 16 can be avoided.

Having been rotated over 60 degrees, the third rotatable unit 10 has been rotated from a first position to a second position, or from a second position to a first position relative to the second rotatable unit 4. Now, the first actuation member 10a1 is maintained in a non-deployed position by the retractor member 4e and is maintained at a distance from the selector 18.

At approximately the same time, the other retractor member 4e3 is also rotated and releases the second actuation member 10a2 to engage the fourth unit 16. However, as can be seen in FIG. 7, the second actuation member 10a2 cannot enter into the first partial groove 20a, as the shape of the second actuation member 10a2 requires the third partial groove 20c to align with the first partial groove 20a for allowing the second actuation member 10a2 to enter into the first partial groove 20a. The second actuation member 10a2 will slide along the surface of the selector 18 without being gripped.

For again actuating the third rotatable unit 10, the second partial groove 20b is moved out of alignment with the first partial groove 20a, and the third partial groove 20c is moved into alignment with the first partial groove 20a. In this situation, the second actuation member 10a2 can enter into the first partial groove 20a. It will be appreciated that it can be possible that the second actuation member 10a2 can already enter into the first partial groove 20a when the first partial groove 20a and the third partial groove 20c are not yet in complete alignment. Hence, the second actuation member 10a2 can already enter into the first partial groove 20a when the third partial groove 20c is still moving into alignment with the first partial groove 20a. When the second actuation member 10a2 has entered into the first partial groove, the first partial groove 20a supports the second actuation member 10a2, allowing a force to be guided from the fourth unit 16 via the second actuation member 10a2 to the third rotatable unit 10. As a result, the third rotatable unit 10 will again be halted, and when, in use, the second rotatable unit 4 will remain rotating, the third rotatable unit 10 will be rotated relative to the second rotatable unit 4. The tooth 26 of the retainer 24 will be moved out of the notch 30 by sliding over a second angled face 30b of the notch. When the second rotatable unit 4 has rotated over approximately 60 degrees after gripping of the second actuation member 10a2 by the first partial groove 20a, the retractor member 4e, now 4e2, knocks the second actuation member 10a2 out of the first partial groove 20a and the third rotatable unit 10 resumes co-rotating with the second rotatable unit 4 again. The tooth 26 of the retainer 24 will be seated at the bottom of a notch 30 again. Having been rotated over 60 degrees, the third rotatable unit 10 has been rotated from a second position to a first position, or from a first position to a second position relative to the second rotatable unit 4. Now, the second actuation member 10a2 is maintained in a non-deployed position by the retractor member 4e again and is maintained at a distance from the selector 18 as shown in FIG. 4a.

At approximately the same time, the other retractor member 4e1 is also rotated and again releases the first actuation member 10a1 to engage the fourth unit 16. However, the first actuation member 10a1 cannot enter into the first partial groove 20a, as the shape of the first actuation member 10a1 requires the second partial groove 20b to align with the first partial groove 20a for allowing the first actuation member 10a1 to enter into the first partial groove 20a. The first actuation member 10a1 will now slide along the surface of the selector 18 without being gripped.

Thus, the selector 18 can be in a first mode for gripping the first actuation member and for not engaging the second actuation member, and in a second mode for gripping the second actuation member and not engaging the first actuation member.

It will be appreciated that in this example, forces from the third rotatable unit 10 via, the actuation members 10a are supported by the first partial groove 20a only. The second and third partial grooves 20b, 20c absorb no, or hardly any, force. The second and third partial grooves merely act as keys to select whether the first or second actuation member can enter the first partial groove 20a or not.

In the example of FIG. 6, it can be seen that the fourth unit 16 includes two toothed racks 22a, 22b. The first toothed rack 22a is connected to a bush carrying the second partial groove 20b. The second toothed rack 22b is connected to a bush carrying the third partial groove 20c. The toothed racks 22a, 22b can be driven by pinions of one or two electric motors.

In the example of FIGS. 6 and 7, the second partial groove 20b and the third partial groove 20c are arranged to be moved relative to the first partial groove 20a in a tangential displacement. Here the second and third partial grooves 20b, 20c are arranged to be moved simultaneously in opposite directions. In this example, the second partial groove 20b is arranged for moving in the same direction the as the first actuation member 10a1, i.e. along with the sliding of the first actuation member 10a1 along the surface of the selector 18, when the second partial groove 20b moves from a non-gripping mode to a gripping mode for the first actuation member 10a1, i.e. from the second mode to the first mode. The third partial groove 20c is arranged for moving in the same direction as the second actuation member 10a2, i.e. along with the sliding of the second actuation member 10a2 along the surface of the selector 18, when the third partial groove 20c moves from a non-gripping mode to a gripping mode for the second actuation member 10a2, i.e. from the first mode to the second mode. Hence, forces on the selector 18 are minimized, and symmetrical for both actuation members 10a.

Figure 16:
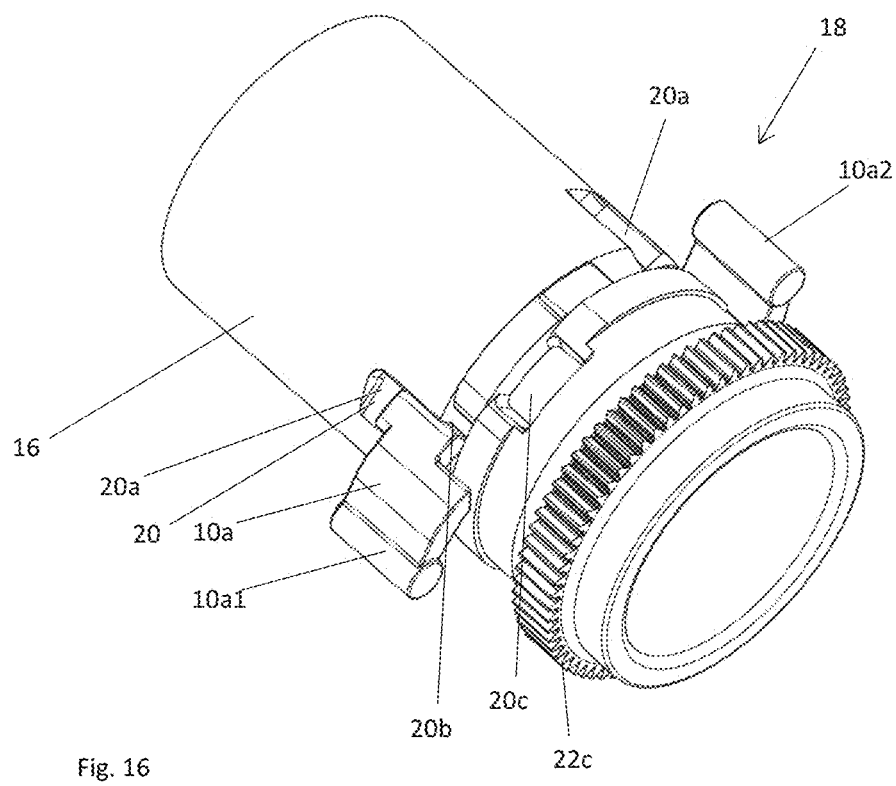
FIG. 16 shows an example of a clutch or brake system.
Figure 17:
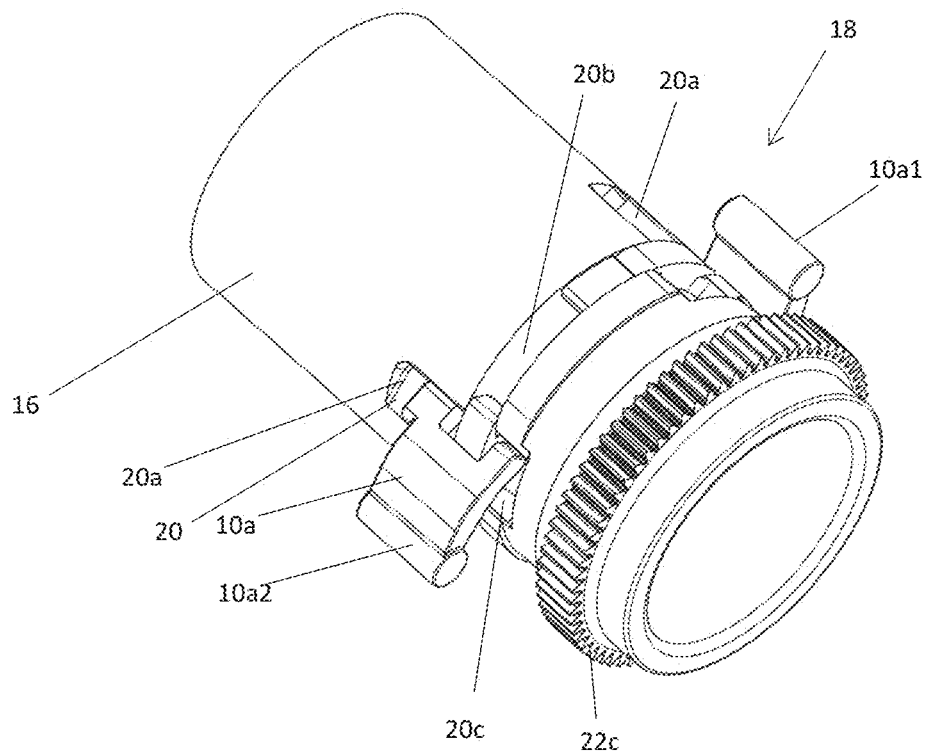
FIG. 17 shows an example of a clutch or brake system.

FIGS. 16 and 17 show an alternative example of the selector 18. In this example, the selector 18 includes a groove 20. In this example, the groove 20 includes a first partial groove 20a, a second partial groove 20b and a third partial groove 20c. In the first mode the first partial groove 20a and second partial groove 20b align as shown in FIG. 16. It is noted that in this first mode the third partial groove 20c does not align with the first partial groove 20a. In the second mode shown in FIG. 17 the first partial groove 20a and third partial groove 20c align. It is noted that in this second mode the second partial groove 20b does not align with the first partial groove 20a. As can be seen in FIG. 16, the first and second partial grooves 20a, 20b aligning, allows the first actuation member 10a1 to enter into the first partial groove 20a, as can also be seen in FIG. 4a. It will be noted that in this example the shape of the first actuation member 10a1, requires the first partial groove 20a and the second partial groove 20b to align for allowing the first actuation member 10a1 to enter the first partial groove 20a. The first partial groove 20a then supports the first actuation member 10a1, allowing a force to be guided from the fourth unit 16 via the first actuation member 10a1 to the third rotatable unit 10. It will be noted that in this example the shape of the second actuation member 10a2, requires the first partial groove 20a and the third partial groove 20c to align for allowing the second actuation member 10a2 to enter the first partial groove 20a. The first partial groove 20a then supports the second actuation member 10a2, allowing a force to be guided from the fourth unit 16 via the second actuation member 10a2 to the third rotatable unit 10.

It will be appreciated that in this example, forces from the third rotatable unit 10 via, the actuation members 10a are supported by the first partial groove 20a only. The second and third partial grooves 20b, 20c absorb no, or hardly any, force. The second and third partial grooves merely act as keys to select whether the first or second actuation member can enter the first partial groove 20a or not.

In the example of FIGS. 16 and 17, it can be seen that the fourth unit 16 includes a single toothed rack 22c. The toothed rack 22c is connected to a bush carrying both the second partial groove 20b and the third partial groove 20c. Hence, the second partial groove 20b and the third partial groove 20c are formed on a unitary part of the selector 18. The toothed rack 22c can be driven by a pinion of an electric motor.

In the example of FIGS. 16 and 17, the second partial groove 20b and the third partial groove 20c are arranged to be moved relative to the first partial groove 20a in a tangential displacement. Here the second and third partial grooves 20b, 20c are arranged to be moved simultaneously in the same direction. In this example, the second partial groove 20b is arranged for moving in the same direction the as the first actuation member 10a1, i.e. along with the sliding of the first actuation member 10a1 along the surface of the selector 18, when the second partial groove 20b moves from a non-gripping mode to a gripping mode for the first actuation member 10a1, i.e. from the second mode to the first mode. The third partial groove 20c is arranged for moving in the opposite direction as the second actuation member 10a2, i.e. along with the sliding of the second actuation member 10a2 along the surface of the selector 18, when the third partial groove 20c moves from a non-gripping mode to a gripping mode for the second actuation member 10a2, i.e. from the first mode to the second mode.

Figure 8A:
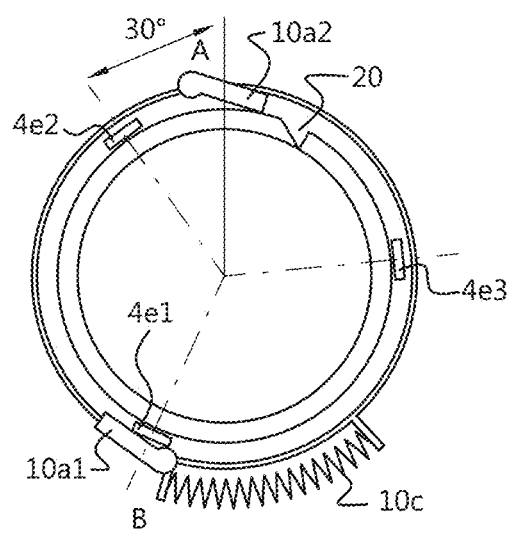
FIGS. 8a-8d show an example of gripping and ungripping the actuation members.
Figure 8B:
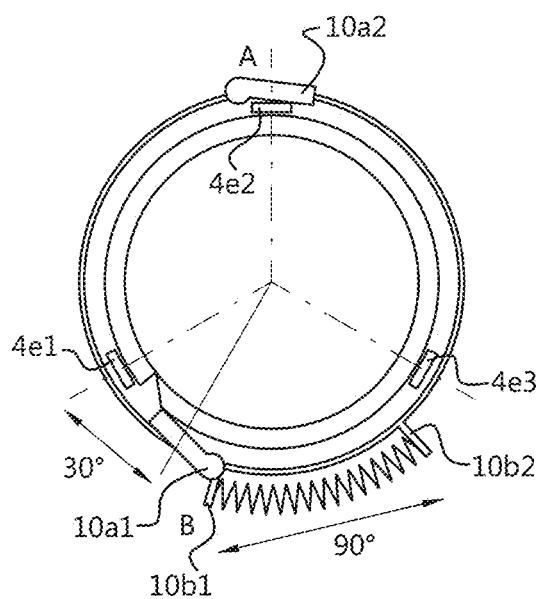
Figure 8C:
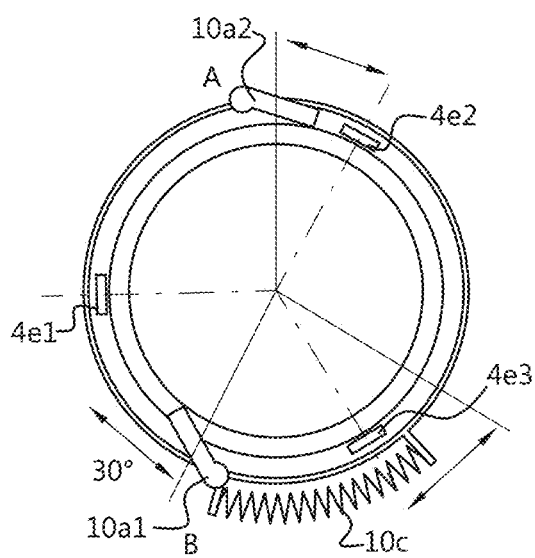
Figure 8D:
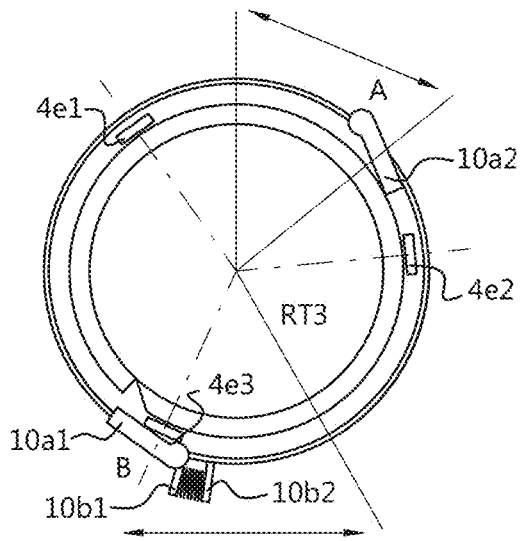

FIGS. 8a-8d show an example of gripping and ungripping the actuation members 10a in the groove 20. In FIG. 8a the first actuation member 10a1 is arrested on the retractor member 4e1. The second actuation member 10a2 is ready for being gripped by the groove 20. In FIG. 8b the second rotatable unit 4 having the retractor members 4e has been rotated over 30 degrees relative to the position in FIG. 8a. In FIG. 8b the second actuation member 10a2 is arrested on the retractor member 4e2. The first actuation member 10a1 is ready for being gripped by the groove 20. In FIG. 8c the first actuation member 10a1 has been gripped by the groove 20. The third rotatable body 10 does not rotate. The retractor member 4e2 slips from under the second actuation member 10a2. The gripping members 4a are not engaged with the first abutment surfaces. The second body portion 10b2 of the third rotatable body 10 is not entrained in rotation over the free upshift angle as no forces act on it. However, continued rotation of the first rotatable unit 2 relative to the third rotatable body 10 causes the gripping members 4a to engage. Then the second body portion 10b2 of the third rotatable body 10 co-rotates with the first rotatable unit 2 in view of the engaged griping members 4a. Then the resilient element 10c is compressed (FIG. 8d) as the first body portion 10b1 of the third rotatable body 10 is still prevented from rotating by the gripped first actuation member 10a1. When the first rotatable unit 2 is driven, the gripping members 4a can automatically disengage. When the first rotatable unit 2 is not driven, engagement of the gripping members 4a can maintain while the first actuation member 10a1 is lift from the groove and the first actuation member is arrested on the retractor 4e3 (forces arresting the first actuation member 10a1 on the retractor 4e3 must thereto be larger than the force of the compressed resilient element 10c). When the gripping members 4a are disengaged (e.g. by driving the first rotatable unit, e.g. by exerting force to the bicycle pedals) the second body portion 10b2 of the third rotatable body 10 is rotated back over the resilient upshift angle while relaxing the resilient member 10c. Herein the gripping members 4a are retained by the retaining members 12. Thus the situation of FIG. 8a is regained.

Figure 9A:
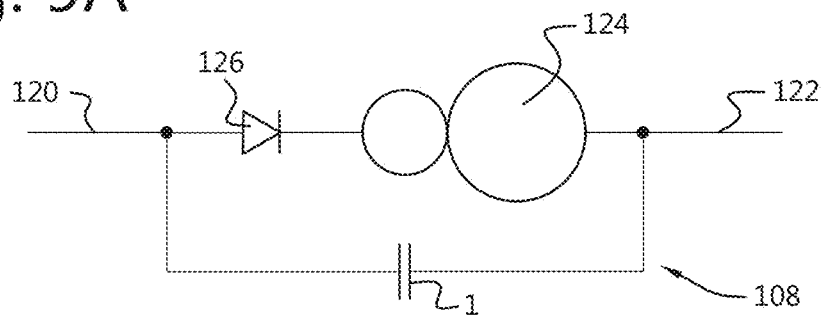
FIGS. 9a-9c show schematic examples of a torque transmission.

FIG. 9a shows a schematic example of a torque transmission 108. The torque transmission 108 includes an input 120 and an output 122. The torque transmission 108 includes a gear transmission 124. Here the gear transmission 124 is a reduction for converting a rotational speed at the input 120 to a reduced rotational speed at the output 122. The torque transmission also includes a clutch or brake system 1, e.g. as described in view of FIGS. 1-7, 16 and 17. The gear transmission 124 is selectably included in the torque transmission 108. The torque transmission is arranged for, in a first mode, transmitting the rotational speed at the input 120 unchanged to the output 122, when the clutch or brake system 1 is engaged. The torque transmission is arranged for, in a second mode, transmitting the rotational speed at the input 120 reduced to the output 122, when the clutch or brake system 1 is disengaged. An overrunning clutch 126 is included, in this example in series with the gear transmission 124.

Figure 10A:
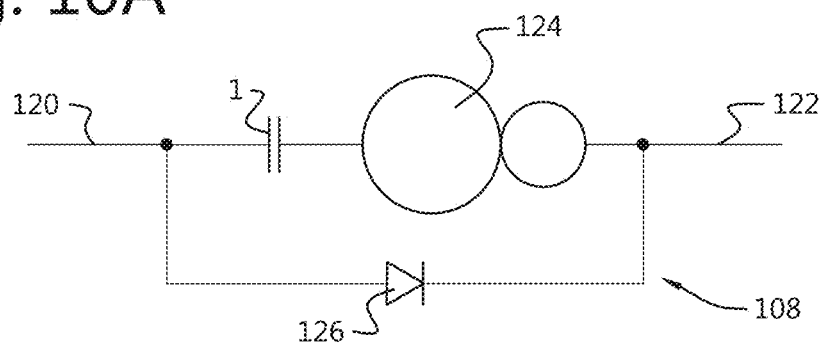
FIGS. 10a-10c show schematic examples of a torque transmission.

FIG. 10a shows a schematic example of a torque transmission 108. The torque transmission 108 includes an input 120 and an output 122. The torque transmission 108 includes a gear transmission 124. Here the gear transmission 124 is a arranged for converting a rotational speed at the input 120 to an increased rotational speed at the output 122. The torque transmission also includes a clutch or brake system 1, e.g. as described in view of FIGS. 1-7, 16 and 17. The gear transmission 124 is selectably included in the torque transmission 108. The torque transmission is arranged for, in a first mode, transmitting the rotational speed at the input 120 unchanged to the output 122, when the clutch or brake system 1 is disengaged. The torque transmission is arranged for, in a second mode, transmitting the rotational speed at the input 120 increased to the output 122, when the clutch or brake system 1 is engaged. An overrunning clutch 126 is included, in this example in parallel with the gear transmission 124.

Figure 9B:
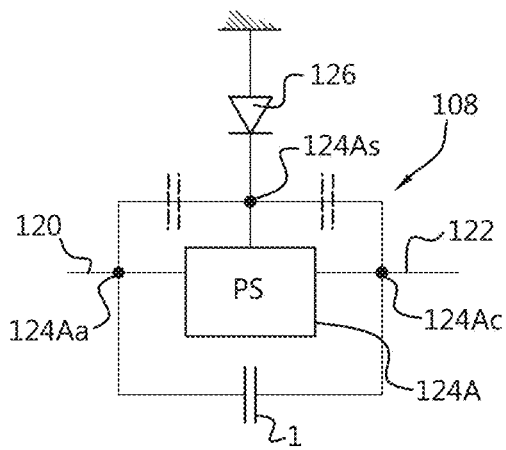

FIG. 9b shows a schematic example of a torque transmission 108. The torque transmission 108 includes an input 120 and an output 122. The torque transmission 108 includes a gear transmission 124. Here the gear transmission 124 is a planetary gear system 124A for converting a rotational speed at the input 120 to a reduced rotational speed at the output 122. In this example, the input 120 is connected to the annulus 124Aa of the planetary gear system 124A. Here, the output 122 is connected to the carrier 124Ac of the planetary gear system 124A. The torque transmission also includes a clutch or brake system 1, e.g. as described in view of FIGS. 1-7, 16 and 17, here included selectively connecting the annulus and the carrier. The sun wheel 124As of the planetary gear system 124A is connected to a non-rotary part via the overrunning clutch 126. The torque transmission is arranged for, in a first mode, transmitting the rotational speed at the input 120 unchanged to the output 122, when the clutch or brake system 1 is engaged. The torque transmission is arranged for, in a second mode, transmitting the rotational speed at the input 120 reduced to the output 122, when the clutch or brake system 1 is disengaged. Decoupling of the overrunning clutch 126 may be required for allowing the output 122 in reverse direction. An input overrunning clutch 128 may be required for freewheeling, e.g. while driving without pedaling.

Figure 9C:
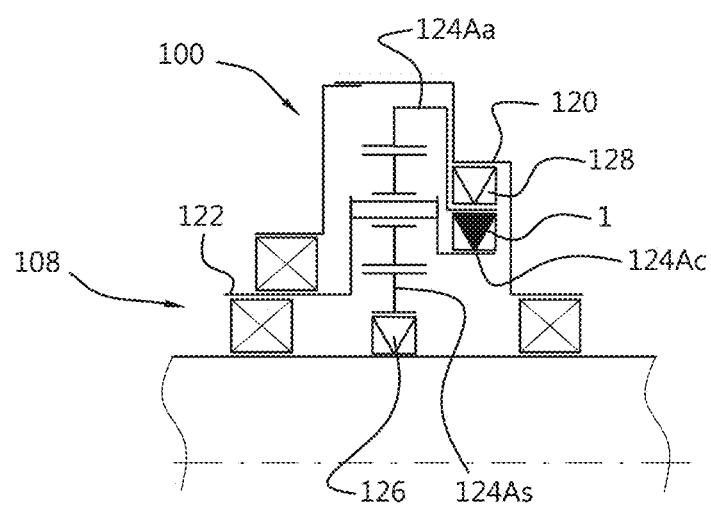

FIG. 9c shows a schematic cross section of a torque transmission 108 according to FIG. 9b in an axle assembly 100, such as a bicycle rear wheel assembly.

Figure 10B:
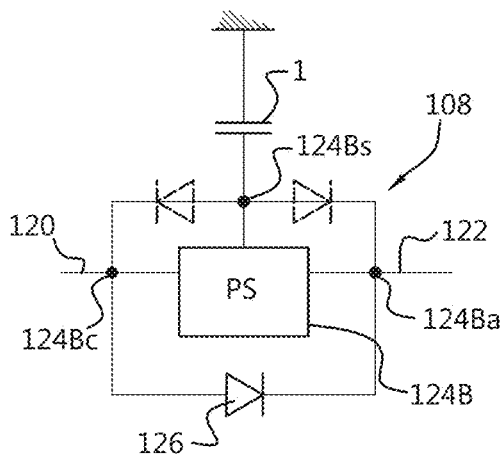

FIG. 10b shows a schematic example of a torque transmission 108. The torque transmission 108 includes an input 120 and an output 122. The torque transmission 108 includes a gear transmission 124. Here the gear transmission 124 is a planetary gear system 124B for converting a rotational speed at the input 120 to an increased rotational speed at the output 122. In this example, the input 120 is connected to the carrier 124Bc of the planetary gear system 124B. Here, the output 122 is connected to the annulus 124Ba of the planetary gear system 124B. The torque transmission also includes a clutch or brake system 1, e.g. as described in view of FIGS. 1-7, 16 and 17, here included selectively connecting the sun wheel 124Bs of the planetary gear system 124B to a non-rotary part. The carrier is connected to the annulus via an overrunning clutch 126. The torque transmission is arranged for, in a first mode, transmitting the rotational speed at the input 120 unchanged to the output 122, when the clutch or brake system 1 is disengaged. The torque transmission is arranged for, in a second mode, transmitting the rotational speed at the input 120 reduced to the output 122, when the clutch or brake system 1 is engaged. Decoupling of the overrunning clutch 126 may be required for allowing the output 122 in reverse direction. An input overrunning clutch 128 may be required for freewheeling, e.g. while driving without pedaling.

Figure 10C:
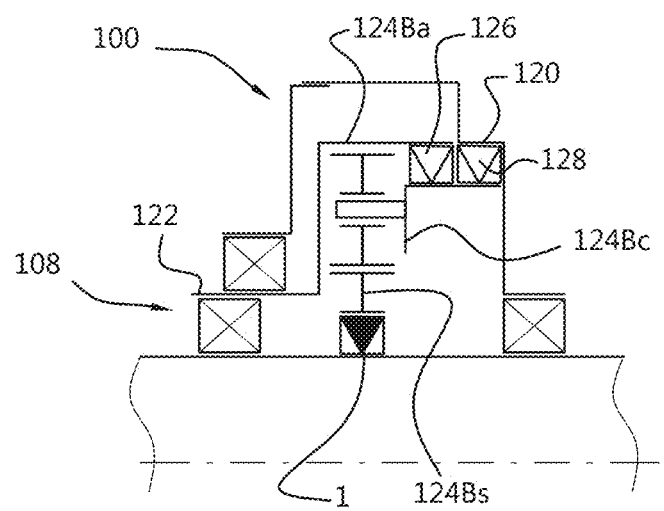

FIG. 10c shows a schematic cross section of a torque transmission 108 according to FIG. 10b in an axle assembly 100, such as a bicycle rear wheel assembly.

Figure 11:
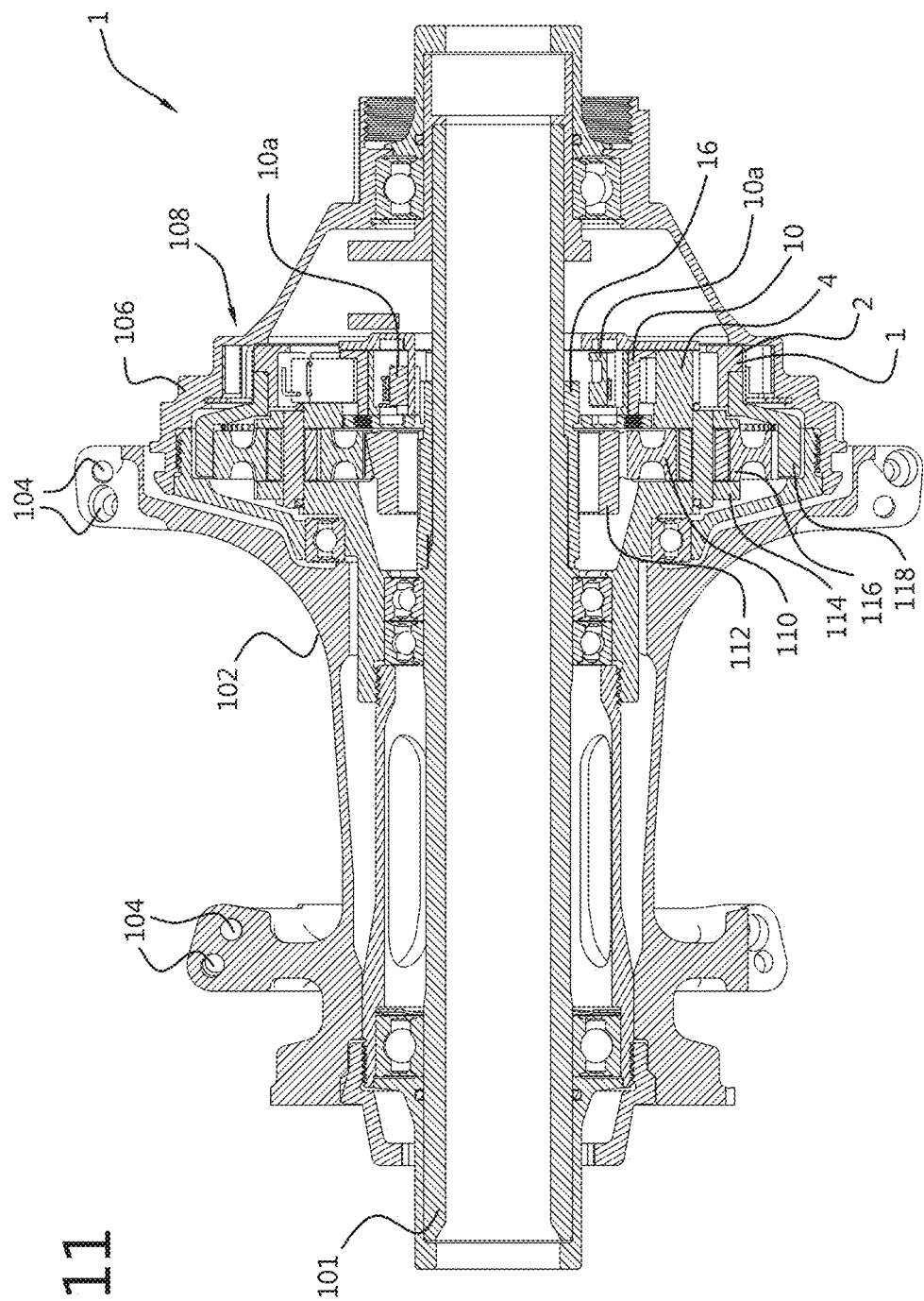
FIG. 11 shows an example of a wheel axle assembly.

FIG. 11 shows an example of an axle assembly 100. In this example, the axle assembly is a rear bicycle assembly. The axle assembly 100 here includes a hollow axle 101. In this example, the hollow axle 101 is arranged for non-rotatably being fixed to a frame, e.g. a bicycle frame. In this example the axle assembly is an axle assembly for a bicycle. The axle assembly 100 includes a hub 102. Here the hub 102 is provided with apertures 104, e.g. for connection of spokes of a wheel, The axle assembly 102 further includes a driver 106. The driver 106 in this example is arranged for receiving a cassette of gear wheels (not shown).

The axle assembly 100 in this example includes a torque transmission 108, Here the torque transmission includes a clutch or brake system 1, e.g. as described in view of FIGS. 1-7, 16 and 17, and a gear means, here a planetary gear 110, The planetary gear 110 includes a sun gear 112, a planet carrier 114 with planet gears 116 and a ring gear 118. The clutch or brake system 1 is arranged in the torque transmission 108 so as to selectively couple two of the sun gear, the planet carrier and the ring gear. In this example, In this example, the clutch or brake system 1 is arranged in the torque transmission 108 so as to selectively couple the planet carrier 114 and the ring gear 118.

The planet carrier 114 is also fixedly coupled to the hub 102. Therefore, depending on whether the first rotatable unit 2 and second rotatable unit 4 are rotationally coupled, or rotationally disengaged, driving the driver 106 causes the hub 102 to rotate according to a first or second gear ratio relative to the driver 106. An overrunning clutch may thereto be positioned between the sun gear 112 and the axle 101. In the examples of FIGS. 1-7, 16, 17 and 8, the first rotatable unit 2, the second rotatable unit 4, the third rotatable unit 10, and the fourth unit 16 are coaxial. Here, the fourth unit 16 is positioned at least partially within the third rotatable unit 10. Here the third rotatable unit 10 is at least partially positioned within the second rotatable unit 4. Here the second rotatable unit 4 is at least partially positioned within the first rotatable unit 2.

FIGS. 12, 13a-b and 14a-b show further examples of a mechanism for moving the third rotatable unit 10 from a first position (e.g. the first position or a first position of the plurality of first positions) to a second position (e.g. the second position or a second position of the plurality of second positions) or from a second position (e.g. the second position or a second position of the plurality of second positions) to a first position (e.g. the first position or a first position of the plurality of first positions) relative to the second rotatable unit.

In the examples of FIGS. 12, 13a-b and 14a-b, the retainer 24 is different than in the example of FIGS. 4A-4C and 5. Here, the retainer 24 is formed as a an axially oriented retainer pin, shown in FIGS. 15a-c. In this example, four retainer pins are provided (divided over 360 degrees by 60-120-60-120 degrees). The retainer pin 24 is slidably held in a bore 24a in the first body portion 10b1. The second rotatable unit 4 includes a, here four, notch 30. The retainer pin 24 is biased towards the second rotatable unit 4 by a resilient element 28, here a compression spring. A tip of the retainer pin 24 which is directed towards the second rotatable unit 4 here is rounded. The rounded tip can match a shape of the notch 30. The notch 30 further has an angled face 30a. Within a certain angle of relative rotation from a predefined position, the third rotatable unit will reset its position due to the spring forces and the shape of the groove and top of the retainer pin.

Figure 15A:
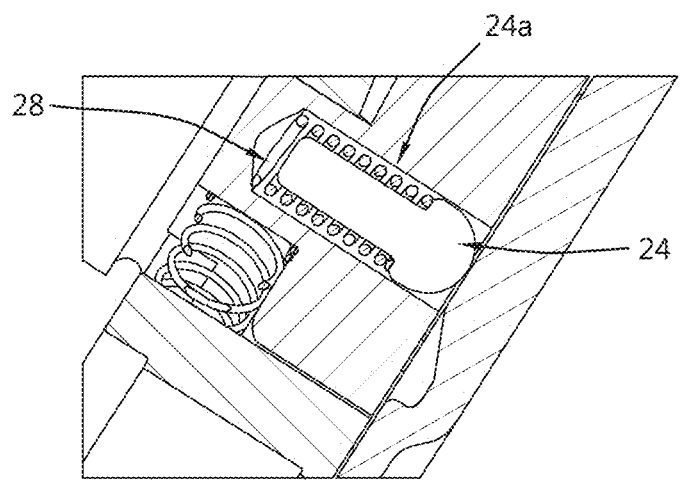
FIG. 15a shows a detail of a clutch or brake system of FIGS. 12-14b.
Figure 15B:
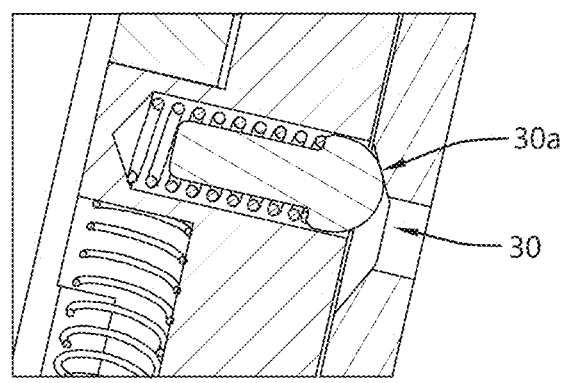
FIG. 15b shows a detail of a clutch or brake system of FIGS. 12-14b.
Figure 15C:
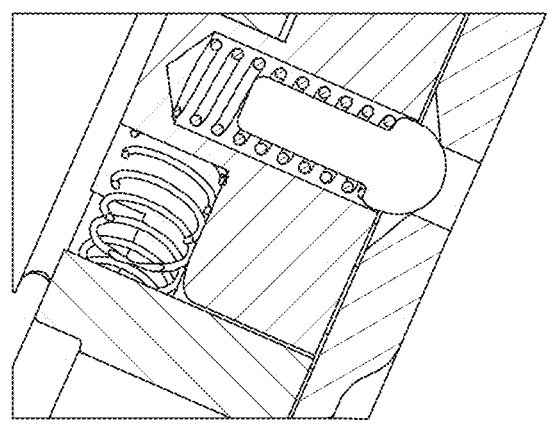
FIG. 15c shows a detail of a clutch or brake system of FIGS. 12-14b.

When the retractor member 4e1 has knocked the first actuation member 10a1 out of the first partial groove 20a, the tip of the retainer pin 24 is on the angled face 30a of the notch 30, as can be seen in FIG. 15b. Due to the biasing force of the resilient element 28, the tip is pushed along the angled face 30a to the bottom of the notch 30, as can be seen in FIG. 15c. As a result, the third rotatable unit 10 assumes a defined angular position relative to the second rotatable unit 4. Also, the slight angular movement from the situation shown in FIG. 15b, with the actuation member 10a1 just freed from the groove 20, to the situation shown in FIG. 15c, enables that the retractor member 4e1 lifts the actuation member 10a1 away from the groove 20, so that mechanical contact between the actuation member 10a1 and the fourth unit 16 can be avoided.

Figure 12:
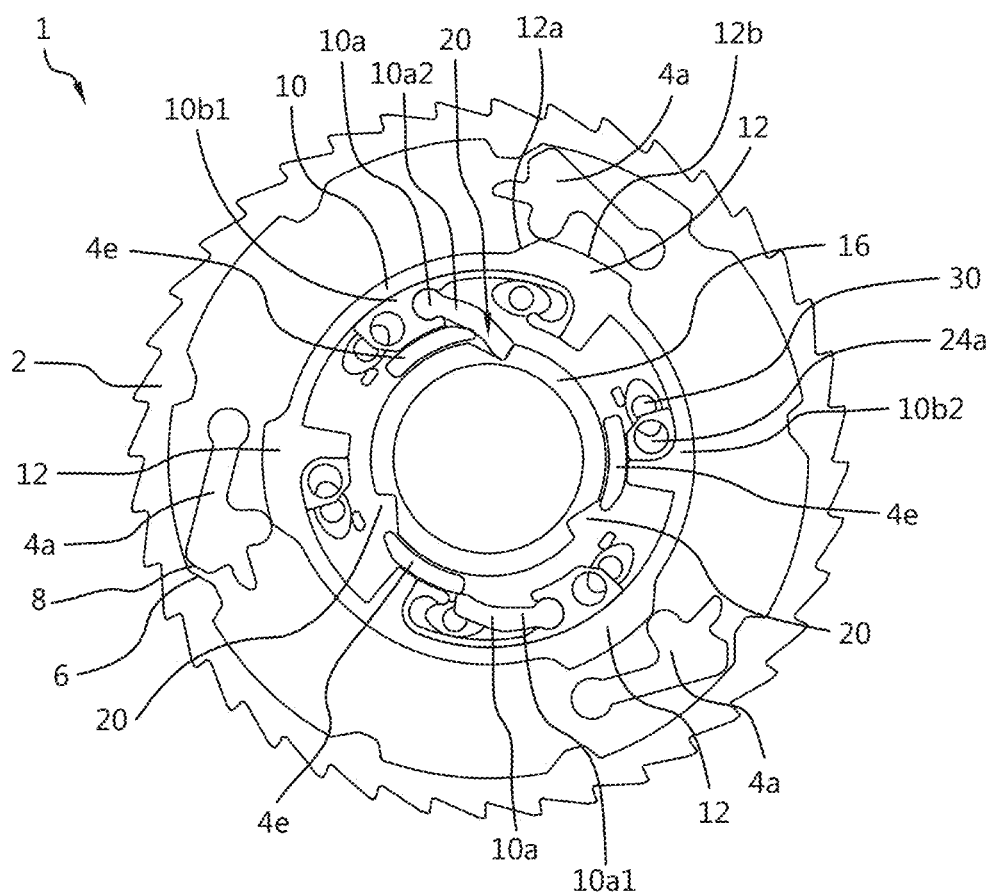
FIG. 12 shows an example of a clutch or brake system.

In the example of FIG. 12, the clutch or brake system 1 is arranged such that when during use the gripping member 4a contacts the retaining member 12 at a border between a ramp, here a sloping surface 12a, and an adjacent plateau surface 12b of the retaining member 12, an outer tip of one actuation member 10a substantially simultaneously contacts a retractor member 4e at a trailing edge thereof, just prior to being released from said retractor member 4e. In the exemplary situation of FIG. 12 the first actuation member 10a1 can be seen as accordingly contacting a retractor member 4e at a trailing edge thereof, while the second actuation member 10a2 can be seen as positioned in one of the grooves 20 just prior to being lifted therefrom by an adjacent retractor member 4e.

The first actuation member 10a1 thus being released from the retractor member 4e when the gripping member 4a reaches the plateau surface 12b enables that while the gripping member 4a is in contact with the plateau surface 12b, at least one of the actuation members 10 is available for engagement with (or is engaged with) a groove 20, so that the gripping member 4a can thereby be disengaged from the first rotating member 2 if and when desired while the gripping member 4a is engaged with the first rotating member 2. In the same exemplary configuration of FIG. 12, the first actuation member 10a1 thus not being released from the retractor member 4e while the gripping member 4a is in contact with the sloping surface 12a helps to prevent the system 1 from locking up by preventing the first actuation member 10a1 from engaging a groove 20 while the gripping member 4a is in contact with, e.g. traveling along, the sloping surface 12a.

Figure 13A:
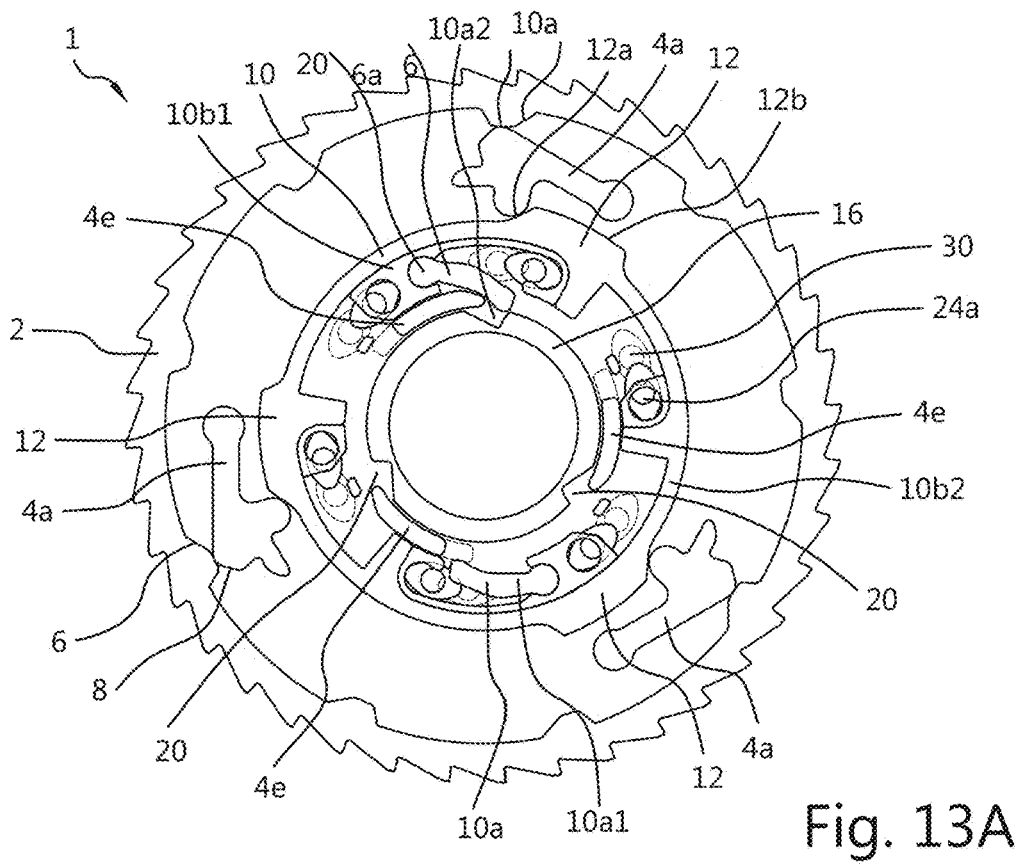
FIG. 13a shows an example of a clutch or brake system.
Figure 13B:
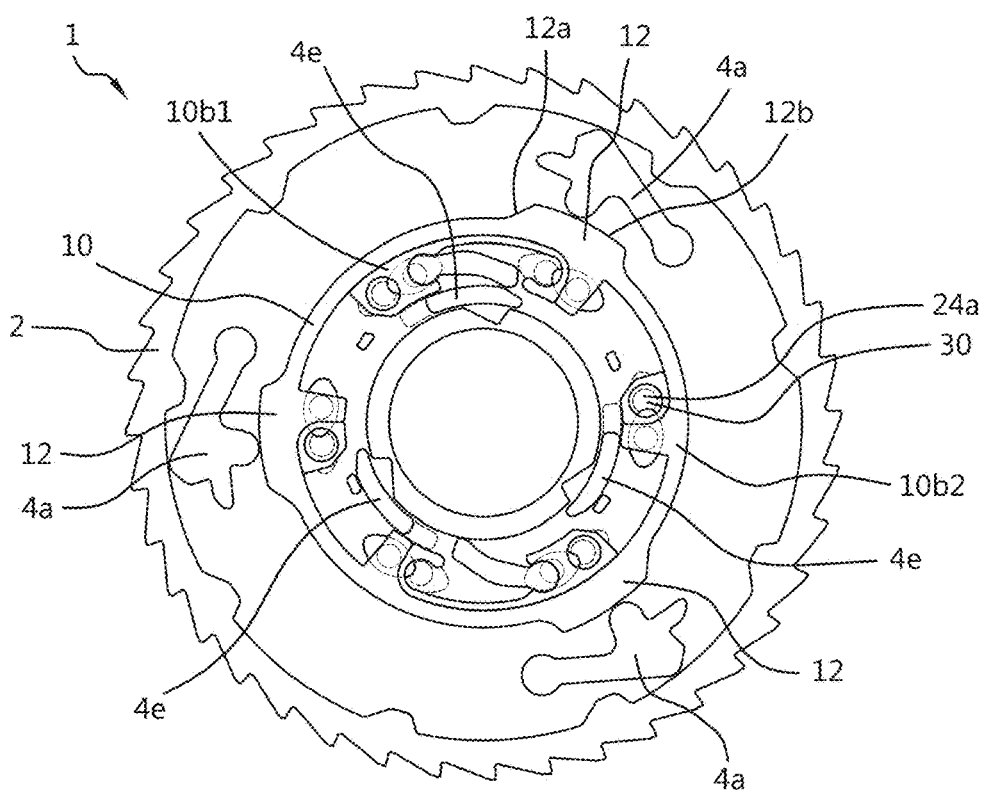
FIG. 13b shows an example of a clutch or brake system.

In the example of FIGS. 13a-b, the clutch or brake system 1 is configured such that when during use the gripping member 4a contacts the retaining member 12 at the sloping surface 12a and nearly contacts (or contacts) the first rotating member 2 at an inner plateau surface 6a adjacent the abutment surface 6, one of the actuation members 10a is substantially simultaneously being released from a groove 20 by a retractor member 4e. FIG. 13a shows the second actuation member 10a2 thus being positioned just outside a groove 20 as a result of contact with an adjacent retractor member 4e. To this end, compared to the example of FIG. 12, the retractor members 4e each extend further along the circumferential direction, here by about 13 degrees compared to FIG. 12.

Such a configuration can help to prevent the system 1 from locking up by preventing that the gripping member 4a is forced (e.g. clamped) against the inner plateau surface 6a. From the situation shown in FIG. 13a onwards, the retainer 24, here retainer pins 24 held in respective bores 24a, can subsequently cause the retaining member 12 to further align with the gripping member 4a by engaging the notches 30, such that the second rotating unit 4 is thereby coupled to the first rotating unit 2. To this end, the notches 30, in particular the respective angled faces 30a, are in the situation of FIG. 13a positioned to be engageable by the retainer pins 24 for rotating the second rotating member 4 to align the notches 30 with the pins 24 at the bores 24a. Once thus aligned, the gripping member 4a is positioned on the plateau surface 12b of the retaining member 12, as shown in FIG. 13b, so that the second and first rotating units 4, 2 are subsequently coupled.

In the configuration of FIG. 13a, the first and second body portions 10b1, 10b2 can be fixed with respect to each other, e.g. as part of a single integral body, wherein a resilient element between the body portions 10b1, 10b2 (such as resilient element 10c in FIGS. 4a-c and 5) can be omitted.

Figure 14A:
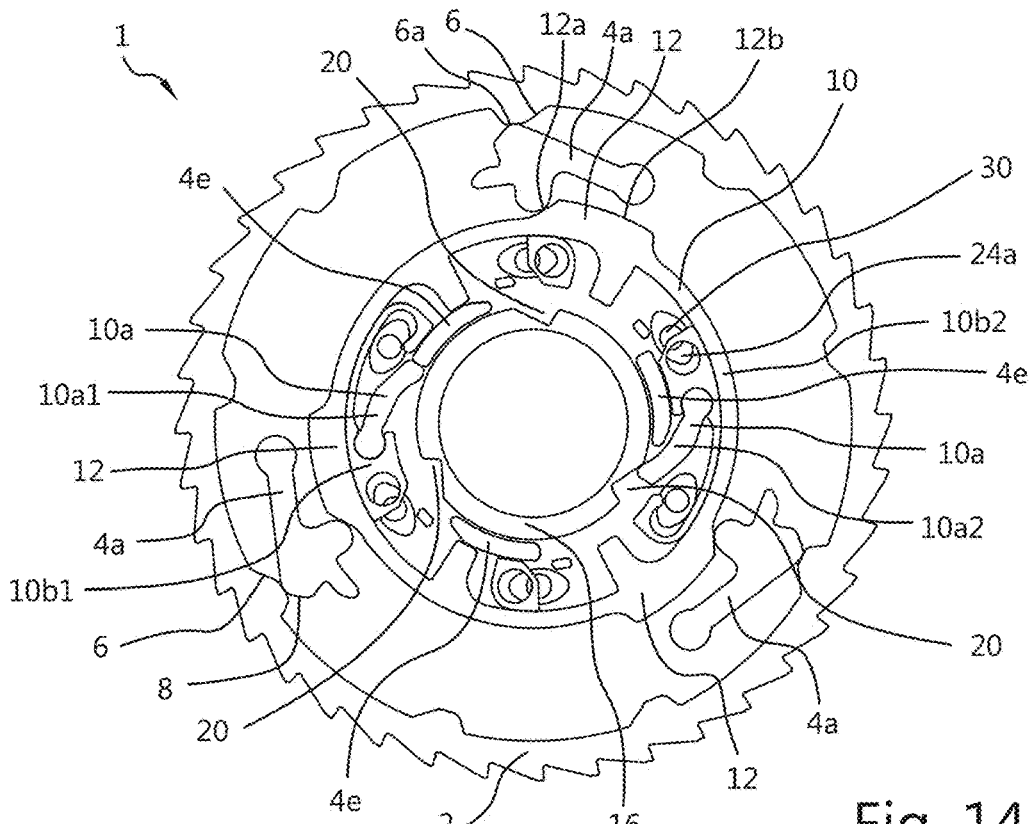
FIG. 14a shows an example of a clutch or brake system.
Figure 14B:
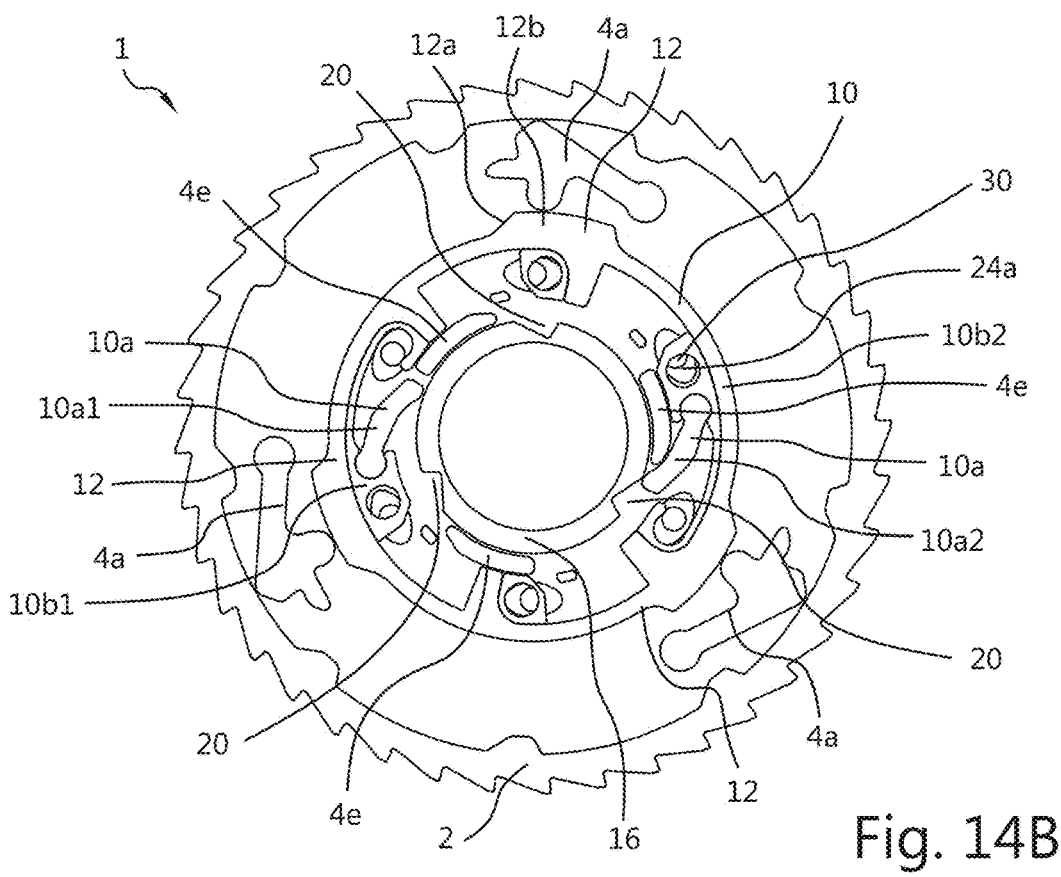
FIG. 14b shows an example of a clutch or brake system.

In the example of FIG. 14a-b, as shown in FIG. 14a, the clutch or brake system 1 is configured such that when during use the gripping member 4a contacts the retaining member 12 at the ramp, here sloping surface, 12a and nearly contacts (or contacts) the first rotating member 2 at an inner plateau surface 6a adjacent the abutment surface 6, one of the actuation members 10a, here the first actuation member 10a1, is substantially simultaneously pushed against a trailing side of a retractor member 4e, in particular pushed by a tangential spring force between the first and second body portions 10b1, 10b2 caused by the resilient element 10c arranged therebetween (see FIGS. 4a-c and 5 for the resilient element 10c). To effectively enable such pushing, the system 1 is preferably configured such that a spring force associated with the retainer 24 (e.g. a total spring force of the retainer springs 28) is small compared to a spring force associated with the resilient element 10c, at least when the gripping member 4a thus contacts the retaining member 12 at the sloping surface 12a while being immediately adjacent the first rotating member 2 at an inner plateau surface 6a adjacent the abutment surface 6.

Such a configuration can help to prevent the system 1 from locking up by preventing that the first actuation member 10a1 can engage with a groove 20 while the gripping member 4a nearly contacts or contacts the inner plateau surface 6a. Once the gripping member 4a has moved away from said surface 6a, the resilient element 10c and/or the retainer 24 can cause the retaining member 12 to subsequently be moved in alignment with the gripping member 4a for completing the coupling between the second and first rotating units 4, 2. During this time, as shown in FIG. 14b, the second actuation member 10a2 is (further) retracted from the third unit 16 by one of the retractor members 4e.

While FIGS. 14a-b show both actuation members 10a as being rotatably held in the first body portion 10b1, alternatively one of the actuation members 10a, in particular the second actuation member 10a2 can be held in the second body portion 10b2 (which as mentioned includes the retaining members 12), so that advantageously said actuation members 10a can move with respect to each other under influence of the resilient element 10c arranged between the body portions 10b1, 10b2, in particular move with respect to each other along the circumferential direction of the system 1. In this way, further prevention of locking up of the system 1 can be provided.

The clutch or brake system 1 can e.g. be used for selectively operating a planetary gear according to a first mode when the second rotatable unit is engaged with the first rotatable unit, and according to a second mode when the second rotatable unit is disengaged from the first rotatable unit. Hence, the clutch or brake system 1 can be used in a torque transmission for operating the torque transmission at a first transmission ratio in the first mode, and at a second, different transmission ratio in the second mode. The clutch or brake system can e.g. be used in a rear hub of a bicycle. The clutch or brake system can then be used e.g. for emulating the functioning of a front derailleur, so as to be able to omit the front derailleur from the bicycle. The invention also relates to a bicycle including such clutch or brake system.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate examples or embodiments, however, alternative embodiments having combinations of all or some of the features described in these separate embodiments are also envisaged.

In the examples, the first rotatable unit includes nine first abutment surfaces. It will be appreciated that other numbers of first abutment surfaces, such as one, two, three, four, six or any other suitable number are also possible. In the examples, the second rotatable unit includes three second abutment surfaces. It will be appreciated that other numbers of second abutment surfaces, such as one, two, four, six or any other suitable number are also possible. In the examples, the third rotatable unit includes three retaining members. It will be appreciated that other numbers of retaining members, such as one, two, four, six or any other suitable number are also possible. In the examples, the third rotatable unit includes two actuation members. It will be appreciated that other numbers of actuation members, such as one, three, four, six or any other suitable number are also possible.

In the examples, the gripping members are separate items hingedly connected to the body portion of the second rotatable unit. It will be appreciated that it is also possible that the gripping members are integral with the body portion of the second rotatable unit.

In the examples, the third rotatable unit includes an first body portion and a second body portion. It will be appreciated that the first and second body portions may also be an integral portion.

In the examples, the actuation members are separate items hingedly connected to the body portion of the third rotatable unit. It will be appreciated that it is also possible that the actuation members are integral with the body portion of the third rotatable unit.

In the examples, the gripping members are arranged for pivoting in a radial direction. It will be appreciated that it is also possible that the gripping members are arranged for pivoting in an axial direction. Then e.g. the second rotatable unit and the first rotatable unit can be positioned, at least partially, axially next to each other. Also, then the third rotatable unit and the second rotatable unit can be positions, at least partially, axially next to each other.

In the examples, the actuation members are arranged for pivoting in a radial direction. It will be appreciated that it is also possible that the actuation members are arranged for pivoting in an axial direction. Then e.g. the third rotatable unit and the fourth unit can be positioned, at least partially, axially next to each other.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A clutch or brake system for a torque transmission having an input arranged for connection to a drive source, and an output arranged for connection to a load, the clutch or brake system including:

a first rotatable unit connectable to the input or output, including at least one first abutment surface;

a second rotatable unit connectable to the output or input, respectively, including at least one gripping member having at least one second abutment surface arranged for selectively engaging the first abutment surface, the first and second abutment surfaces being adapted to each other so as to allow disengaging under load;

a third rotatable unit including at least one retaining member having a plateau and a ramp to the plateau, the third rotatable unit being arranged for selectively being in one of one or more first rotational positions or one of one or more second rotational positions relative to the second rotatable unit, wherein the at least one retaining member in a first rotational position locks the at least one second abutment surface in a first disposition for rotationally coupling the second rotatable unit to the first rotatable unit, and in a second rotational position releases the at least one second abutment surface to a second disposition for decoupling the second unit from the first unit;

wherein the third rotatable unit includes a first actuation member arranged for moving the third rotatable unit from a first position to a second position and a second actuation member arranged for moving the third rotatable unit from a second position to a first position relative to the second rotatable unit;

a fourth unit including a selector, the selector being arranged for selectively being in a first mode or second mode, the selector in the first mode being arranged for gripping the first actuation member for rotating the third rotatable unit from a first position to a second position relative to the second rotatable unit;

the selector in the second mode being arranged for gripping the second actuation member for rotating the third rotatable unit from a second position to a first position relative to the second rotatable unit;

the second rotatable unit including a retractor member arranged for moving the first and/or second actuation member out of engagement with the selector;

wherein the at least one second abutment surface and the retractor member are angularly positioned such that while the at least one second abutment surface moves from the second disposition to the first disposition the first actuation member is kept out of engagement with the selector by a trailing end of the retractor member when the at least one gripping member contacts the at least one retaining member at a border between the ramp and the plateau, and the first actuation member is released from the retractor member when the at least one gripping member reaches the plateau of the at least one retaining member.

2. The clutch or brake system of claim 1, wherein the at least one second abutment surface and the first actuation member are positioned such that while the at least one second abutment surface moves from the second disposition to the first disposition the first actuation member rests on the trailing end of the retractor member.

3. The clutch or brake system of claim 1, wherein the at least one second abutment surface and the first actuation member are positioned such that while the at least one second abutment surface moves from the second disposition to the first disposition the first actuation member is biased against a trailing side of the retractor member.

4. The clutch or brake system of claim 1, wherein the at least one second abutment surface and the second actuation member are angularly positioned such that when the at least one gripping member engages a ramp of the at least one retaining member and the at least one second abutment surface of the gripping member engages or is immediately adjacent a radially inner surface of the first rotatable unit, the second actuation member is moved out of engagement with the selector by the retractor member.

5. The clutch or brake system of claim 1, wherein the third rotatable unit has predefined angular indexing positions with respect to the second rotatable unit.

6. The clutch or brake system of claim 5, wherein the second and/or third rotatable units are arranged such that each predefined angular indexing position has associated therewith an angular biasing area, such that when the second and third rotatable units are rotationally within the biasing area relative to each other they are biased into one of the predefined angular indexing positions.

7. The clutch or brake system of claim 5, wherein the at least one second abutment surface arranged for radially moving in and out of engagement with the at least one first abutment surface and wherein the predefined angular indexing positions are such that in at least one of the predefined angular indexing positions the at least one gripping member is positioned on top of the at least one retaining member.

8. The clutch or brake system of claim 5, wherein the at least one second abutment surface arranged for radially moving in and out of engagement with the at least one first abutment surface and wherein the predefined angular indexing positions are such that in at least one of the predefined angular indexing positions the at least one gripping member is positioned on a leading ramp of the at least one retaining member.

9. The clutch or brake system according to claim 5, wherein the third rotatable unit includes at least one retainer, and the second rotatable unit includes at least one notch, or wherein the second rotatable unit includes at least one retainer, and the third rotatable unit includes at least one notch, for indexing the second rotatable unit relative to the third rotatable unit, in one of the predefined angular indexing positions, by resilient engagement of at least one of the at least one retainers in at least one of the at least one notches.

10. The clutch or brake system according to claim 9, wherein the second and/or third units are arranged such that each indexing position has associated therewith an angular biasing area, such that when the second and third units are rotationally within the biasing area relative to each other they are biased into the predefined angular indexing position and wherein the at least one notch has a tapered mouth for biasing the retainer towards the predefined angular indexing position.

11. The clutch or brake system of claim 9, wherein the at least one retainer is formed as a pin slidable along an axis parallel to a rotational axis of the third rotatable unit.

12. The clutch or brake system according to claim 6, wherein the first and/or second actuation member is positioned to be moved out of engagement with the selector once the second and third rotatable units are rotationally within the biasing area relative to each other.

13. The clutch or brake system of claim 1, wherein the first and/or second abutment surface is biased to disengage.

14. A torque transmission, including a clutch or brake system for instance according to claim 1 and a planetary gear, wherein the clutch or brake system is arranged in the torque transmission so as to selectively couple two of a sun gear, a planet carrier and a ring gear of the planetary gear.

15. The torque transmission of claim 14, wherein the ring gear is rotationally fixed to the first rotatable unit and the planet carrier is rotationally fixed to the second rotatable unit, or wherein the ring gear is rotationally fixed to the second rotatable unit and the planet carrier is rotationally fixed to the first rotatable unit.

16. The torque transmission of claim 14, wherein the sun gear is connected to the fourth unit via a one way bearing.

17. A wheel axle assembly according to claim 14, including a torque transmission.

18. A bicycle including a clutch or brake system according to claim 1.

* * * * *